(12) United States Patent
Pattabiraman et al.

(10) Patent No.: US 12,260,433 B2
(45) Date of Patent: *Mar. 25, 2025

(54) SYSTEMS AND METHODS FOR AUTOMATICALLY GENERATING REMARKETING LISTS

(71) Applicant: GOOGLE LLC, Mountain View, CA (US)

(72) Inventors: Bharath Pattabiraman, Santa Clara, CA (US); Ardian Poernomo, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,713

(22) Filed: Jan. 4, 2022

(65) Prior Publication Data
US 2022/0129953 A1   Apr. 28, 2022

Related U.S. Application Data

(63) Continuation of application No. 16/787,779, filed on Feb. 11, 2020, now Pat. No. 11,216,852, which is a
(Continued)

(51) Int. Cl.
*G06Q 30/0241*   (2023.01)
*G06Q 30/0207*   (2023.01)
(Continued)

(52) U.S. Cl.
CPC ..... *G06Q 30/0277* (2013.01); *G06Q 30/0222* (2013.01); *G06Q 30/0253* (2013.01); *G06Q 30/0641* (2013.01)

(58) Field of Classification Search
CPC . G06Q 30/0207–0277; G06Q 30/0277; G06Q 30/0222; G06Q 30/0253;
(Continued)

(56) References Cited

U.S. PATENT DOCUMENTS

| | | | |
|---|---|---|---|
| 5,202,960 A * | 4/1993 | Seiler | G06T 11/40 345/443 |
| 6,286,005 B1 * | 9/2001 | Cannon | G06Q 30/0201 455/2.01 |

(Continued)

FOREIGN PATENT DOCUMENTS

| | | |
|---|---|---|
| CN | 1842782 A | 10/2006 |
| CN | 102057372 A | 5/2011 |
| CN | 103597508 A | 2/2014 |

OTHER PUBLICATIONS

Eric Fettman, Programmatic Advertising: Creating Remarketing Audiences from Google Analytics, 2015 (Year: 2015).*
(Continued)

*Primary Examiner* — Tarek Elchanti
(74) *Attorney, Agent, or Firm* — MARSHALL, GERSTEIN & BORUN LLP

(57) ABSTRACT

Systems and methods for automatically generating remarketing lists based on client sessions are provided. The system can include a visitor management module to identify client sessions established at a website. The visitor management module can determine node pairs including destination nodes and referrer nodes. The system can include a graph construction module to construct a graph including the node pairs and edges between the node pairs representing click-through rates. The system can include a graph clustering module to assign information resources to a first group based on one of i) a number of edges between the nodes and a conversion node or ii) click-through rates of node pairs including. The system includes a remarketing list generation module to assign the first group of information resources to a remarketing list. The remarketing list generation module can assign client identifiers that accessed the first group of information resources to the remarketing list.

14 Claims, 8 Drawing Sheets

Related U.S. Application Data continuation of application No. 14/984,341, filed on Dec. 30, 2015, now Pat. No. 10,565,627.

(51) Int. Cl.
  *G06Q 30/0251* (2023.01)
  *G06Q 30/0601* (2023.01)

(58) Field of Classification Search
  CPC ............ G06Q 30/0641; G06Q 30/0282; G06F 16/954; G06F 18/23
  USPC ........................................ 705/14.73; 345/443
  See application file for complete search history.

(56) References Cited

U.S. PATENT DOCUMENTS

| | | | | |
|---|---|---|---|---|
| 7,003,476 | B1* | 2/2006 | Samra | G06Q 30/00 705/7.33 |
| 7,941,525 | B1* | 5/2011 | Yavilevich | H04L 67/535 709/224 |
| 9,053,129 | B1* | 6/2015 | Covell | G06Q 30/0241 |
| 10,229,424 | B1* | 3/2019 | Liu | G06Q 30/02 |
| 10,248,973 | B1* | 4/2019 | Buller | G06Q 30/0275 |
| 10,565,627 | B2 | 2/2020 | Pattabiraman et al. | |
| 10,810,613 | B1* | 10/2020 | Goodhart | G06Q 30/0201 |
| 11,080,762 | B1* | 8/2021 | Amini | G06F 16/958 |
| 11,216,852 | B2 | 1/2022 | Pattabiraman et al. | |
| 2003/0009497 | A1* | 1/2003 | Yu | G06Q 10/10 715/256 |
| 2003/0131097 | A1* | 7/2003 | Kasriel | G06F 16/9558 709/224 |
| 2003/0176931 | A1* | 9/2003 | Pednault | G06K 9/6256 700/44 |
| 2005/0240580 | A1* | 10/2005 | Zamir | H04L 67/025 |
| 2006/0224938 | A1* | 10/2006 | Fikes | G06F 16/955 707/E17.112 |
| 2007/0005425 | A1* | 1/2007 | Bennett | H04L 67/306 705/14.73 |
| 2007/0150537 | A1* | 6/2007 | Graham | G06Q 30/02 709/203 |
| 2007/0244741 | A1* | 10/2007 | Blume | G06Q 30/0269 705/7.31 |
| 2008/0033784 | A1* | 2/2008 | Chalimadugu | G06Q 30/0277 705/7.29 |
| 2008/0086368 | A1* | 4/2008 | Bauman | H04W 4/029 705/7.34 |
| 2008/0086741 | A1* | 4/2008 | Feldman | G06Q 30/0242 725/9 |
| 2008/0103887 | A1* | 5/2008 | Oldham | G06Q 30/0275 705/14.71 |
| 2008/0109306 | A1* | 5/2008 | Maigret | G06Q 30/0277 705/14.46 |
| 2008/0162206 | A1* | 7/2008 | Mak | G06Q 30/0255 705/14.53 |
| 2008/0183558 | A1* | 7/2008 | Koran | G06Q 30/0256 705/14.54 |
| 2008/0189169 | A1* | 8/2008 | Turpin | G06Q 30/0264 705/7.33 |
| 2008/0195476 | A1 | 8/2008 | Marchese et al. | |
| 2008/0256461 | A1* | 10/2008 | Aksemit | G06F 1/16 715/806 |
| 2008/0281694 | A1* | 11/2008 | Kretz | G06Q 30/02 705/14.64 |
| 2008/0281817 | A1* | 11/2008 | White | G06F 16/9535 |
| 2009/0006363 | A1* | 1/2009 | Canny | G06Q 30/02 707/999.005 |
| 2009/0063250 | A1* | 3/2009 | Burgess | G06Q 30/0273 705/14.69 |
| 2009/0063268 | A1* | 3/2009 | Burgess | G06Q 30/0239 705/14.39 |
| 2009/0063984 | A1* | 3/2009 | Agarwal | G06Q 30/02 715/733 |
| 2009/0083222 | A1* | 3/2009 | Craswell | G06F 16/951 |
| 2009/0125350 | A1* | 5/2009 | Lessing | G06Q 10/08 705/7.12 |
| 2009/0259533 | A1* | 10/2009 | Utter | G06Q 30/0226 705/14.27 |
| 2009/0271255 | A1* | 10/2009 | Utter | G06Q 30/0207 705/14.1 |
| 2009/0282034 | A1* | 11/2009 | Goronzy | H04H 60/46 707/999.005 |
| 2010/0030647 | A1* | 2/2010 | Shahshahani | G06Q 30/02 705/14.66 |
| 2010/0076850 | A1* | 3/2010 | Parekh | G06Q 30/02 705/14.66 |
| 2010/0088152 | A1* | 4/2010 | Bennett | G06Q 30/0601 705/26.1 |
| 2010/0088177 | A1* | 4/2010 | Lu | G06Q 30/0275 705/14.43 |
| 2011/0035272 | A1* | 2/2011 | Bhatt | G06Q 30/0247 705/14.42 |
| 2011/0106631 | A1* | 5/2011 | Lieberman | G06Q 30/0241 715/843 |
| 2011/0137721 | A1* | 6/2011 | Bansal | G06Q 30/02 705/14.41 |
| 2011/0145753 | A1* | 6/2011 | Prakash | G06F 3/04812 715/783 |
| 2012/0226563 | A1* | 9/2012 | Lu | G06Q 30/0244 705/14.66 |
| 2012/0259854 | A1* | 10/2012 | Hsiao | G06Q 30/0251 707/E17.046 |
| 2013/0073609 | A1 | 3/2013 | Connolly et al. | |
| 2014/0046754 | A1 | 2/2014 | Lee et al. | |
| 2014/0181691 | A1* | 6/2014 | Poornachandran | H04W 4/80 715/753 |
| 2014/0297394 | A1* | 10/2014 | Li | G06T 1/0064 705/14.55 |
| 2014/0351243 | A1* | 11/2014 | Error | G06F 11/323 707/722 |
| 2015/0046941 | A1* | 2/2015 | Tanabe | H04N 21/812 725/32 |
| 2015/0058119 | A1 | 2/2015 | Atli et al. | |
| 2015/0234542 | A1 | 8/2015 | Kirillov | |
| 2015/0248699 | A1* | 9/2015 | Hammer | G06Q 30/0256 705/14.54 |
| 2015/0254327 | A1* | 9/2015 | Patil | G06F 40/30 707/739 |
| 2015/0363826 | A1* | 12/2015 | Tseng | G06Q 30/0261 705/14.57 |
| 2016/0239868 | A1* | 8/2016 | Demsey | H04W 4/029 |
| 2016/0352664 | A1* | 12/2016 | Braines | G06F 3/04842 |
| 2017/0061502 | A1* | 3/2017 | Zhang | G06Q 30/0277 |
| 2017/0193568 | A1* | 7/2017 | Pattabiraman | G06Q 30/0277 |
| 2017/0262885 | A1* | 9/2017 | Fuentes | H04L 67/02 |
| 2017/0316467 | A1* | 11/2017 | Seiler | G06Q 30/0277 |
| 2018/0330387 | A1* | 11/2018 | Harris | G06Q 10/08 |
| 2019/0087852 | A1* | 3/2019 | Blom | G06Q 30/0269 |
| 2021/0099545 | A1* | 4/2021 | Pattabiraman | H04L 43/0876 |

OTHER PUBLICATIONS

Cai, Chao, "Using First-Party Website Identity for Remarketing Attribution and Optimization", Defensive Publications Series, Technical Disclosure Commons, vol. 82, Nov. 30, 2015 (8 pages).

Examination Report for EP Appln. Ser. No. 16787627.5 dated Feb. 4, 2020 (12 pages).

Final Office Action for U.S. Appl. No. 14/984,341 dated Jul. 5, 2019 (13 pages).

First Office Action for CN Appln. Ser. No. 201680034574.8 dated Feb. 1, 2021 (33 pages).

International Preliminary Report on Patentability for PCT Appl. Ser. No. PCT/US2016/055792 dated Apr. 16, 2018 (43 pages).

International Search Report and Written Opinion for PCT Appl. Ser. No. PCT/US2016/055792 dated Dec. 8, 2016 (14 pages).

Non-Final Office Action for U.S. Appl. No. 14/984,341 dated Feb. 5, 2019 (12 pages).

Notice of Allowance for U.S. Appl. No. 14/984,341 dated Oct. 25, 2019 (13 pages).

(56) References Cited

OTHER PUBLICATIONS

Notification Concerning Informal Communications with the Applicant for PCT/US2016/055792 mailed from the International Preliminary Examining Authority at the EPO on Jan. 4, 2018 (9 pgs.).
Olga et al., "Remarking as a Tool in Online Advertising", Ovidius University Annals, Economic Sciences Series, vol. XIV, Issue 2, 2014 (4 pages).
First Office Action for Chinese Application No. 202111096453.5, dated Dec. 25, 2024.

\* cited by examiner

| Webpage | Conversion Rate |
|---|---|
| Cart | 0.81 |
| Shoe2 | 0.62 |
| Dress1 | 0.36 |
| Shoe1 | 0.34 |
| Item1 | 0.30 |
| Dress2 | 0.28 |
| Bag2 | 0.26 |
| Dress3 | 0.21 |
| Shoe3 | 0.21 |
| Shoes | 0.14 |
| Men's | 0.13 |
| Clothing | 0.12 |
| Home | 0.09 |

FIG. 6

SYSTEMS AND METHODS FOR AUTOMATICALLY GENERATING REMARKETING LISTS

CROSS-REFERENCE TO RELATED APPLICATIONS

This application claims the benefit of and priority under 35 U.S.C. 120 as a continuation of U.S. patent application Ser. No. 16/787,779, filed on Feb. 11, 2020, entitled SYSTEMS AND METHODS FOR AUTOMATICALLY GENERATING REMARKETING LISTS," which claims the benefit of and priority under 35 U.S.C. 120 as a continuation of U.S. patent application Ser. No. 14/984,341, entitled "SYSTEMS AND METHODS FOR AUTOMATICALLY GENERATING REMARKETING LISTS," filed on Dec. 30, 2015, the contents of which are incorporated herein by reference in its entirety.

BACKGROUND

In a computer networked environment such as the internet, third-party content providers provide third-party content items for display on end-user computing devices. These third-party content items, for example, advertisements, can be displayed on a web page associated with a respective publisher. These third-party content items can include content identifying the third-party content provider that provided the content item. The third-party content item may direct a user to the website of the third-party content provider. The third-party content provider may be interested in understanding navigation behaviors of the users that visit their website.

SUMMARY

At least one aspect is directed to a system for automatically generating remarketing lists based on client sessions. The system can include a visitor management module executing on a data processing system and configured to identify a plurality of client sessions established at a website, each client session corresponding to a client device visiting one or more information resources of the website. The visitor management module can further be configured to determine for each of the plurality of client sessions, one or more node pairs, each of the one or more node pairs including a destination node representing a destination information resource and a referrer node representing a referrer information resource corresponding to an information resource from which the client device visited the destination information resource. The system can further include a graph construction module executing on the data processing system and configured to construct using the plurality of client sessions, a graph including the determined node pairs and a plurality of edges between the destination nodes and corresponding referrer nodes of the node pairs, each edge of the plurality of edges between a destination node and a referrer node of a respective node pair representing a ratio of a first number of client devices that visited the destination information resource from the referrer information resource to a second number of client devices that visited the referrer information resource. The system can further include a graph clustering module executing on the data processing system and configured to assign one or more information resources of the plurality of information resources to a first group of information resources based on one of i) a number of edges between the nodes corresponding to the information resources of the first group and a conversion node representing an information resource presented responsive to a conversion event or ii) click-through rates of node pairs including the same referrer node and different destination nodes. The system can further include a remarketing list generation module executing on the data processing system and configured to assign the first group of information resources to a remarketing list, the remarketing list including client identifiers of client devices that visited the information resources assigned to the first group of information resources. The remarketing list generation module can further be configured to assign client identifiers that accessed the first group of information resources to the remarketing list. The remarketing list generation module can be further configured to select, in response to receiving a request for content from one of the client identifiers that accessed the first group of information resources, a content item for display using the remarketing list.

In some implementations, the visitor management module can receive one or more of an identity of a destination information resource, an identity of a referrer information resource, or times at which the destination resource and the referrer information resource were visited by a client device.

In some implementations, the graph construction module can omit from the graph at least one edge of the plurality of edges, and a node pair associated with the at least one edge, having a ratio below a ratio threshold.

In some implementations, the visitor management module can identify the conversion node based on a number of referrer resource identifiers linked to the conversion node. In some implementations, the conversion node corresponds to one of a plurality of nodes of the graph with which the most referrer nodes are linked relative to a number of referrer nodes linked with each of the other nodes of the plurality of nodes.

In some implementations, the graph clustering module can execute on the data processing system assigning each of the nodes corresponding to the information resources of the first group having a same number of edges between each of the nodes and the conversion node to the first group.

In some implementations, the graph clustering module can determine a click-through rate threshold, and the graph clustering module can assign one or more information resources associated with an edge linked to the same referrer node with the edge having a click-through rate greater than the click-through rate threshold to the first group.

In some implementations, the graph clustering module can cluster the one or more information resources based on proximity of the one or more nodes corresponding to the one or more information resources to each other in the graph and based on weight of the click-through rates between the one or more nodes.

In some implementations, the assigning the one or more information resources of the plurality of information resources to the first group based on click-through rates of node pairs including the same referrer node and different destination nodes is based on a predetermined hierarchical model of a pages of a website.

In some implementations, the assigning the one or more information resources of the plurality of information resources to the first group based on click-through rates of node pairs including the same referrer node and different destination nodes is based on a predetermined hierarchical model of pages of a website. In some implementations, the constructing of the graph is based on the predetermined hierarchical model of pages of a website.

At least one aspect is directed to a method for automatically generating remarketing lists based on client sessions. The method includes identifying, by a data processing system including one or more processors, a plurality of client sessions established at a website, each client session corresponding to a client device visiting one or more information resources of the website. The method includes determining, by the data processing system, for each of the plurality of client sessions, one or more node pairs, each of the one or more node pairs including a destination node representing a destination information resource and a referrer node representing a referrer information resource corresponding to an information resource from which the client device visited the destination information resource. The method includes constructing, by the data processing system, using the plurality of client sessions, a graph including the determined node pairs and a plurality of edges between the destination nodes and corresponding referrer nodes of the node pairs, each edge of the plurality of edges between a destination node and a referrer node of a respective node pair representing a ratio of a first number of client devices that visited the destination information resource from the referrer information resource to a second number of client devices that visited the referrer information resource. The method includes assigning one or more information resources of the plurality of information resources to a first group of information resources based on one of i) a number of edges between the nodes corresponding to the information resources of the first group and a conversion node representing an information resource presented responsive to a conversion event or ii) click-through rates of node pairs including the same referrer node and different destination nodes. The method includes assigning the first group of information resources to a remarketing list, the remarketing list including client identifiers of client devices that visited the information resources assigned to the first group of information resources. The method includes assigning client identifiers that accessed the first group of information resources to the remarketing list. The method includes selecting, in response to receiving a request for content from one of the client identifiers that accessed the first group of information resources, a content item for display using the remarketing list.

In some implementations, the method further includes receiving, by the data processing system, one or more of an identity of a destination information resource, an identity of a referrer information resource, or times at which the destination resource and the referrer information resource were visited by a client device.

In some implementations, the method further includes omitting from the graph, by the data processing system, at least one edge of the plurality of edges, and a node pair associated with the at least one edge, having a ratio below a ratio threshold.

In some implementations, the method further includes identifying, by the data processing system, the conversion node based on a number of referrer resource identifiers linked to the conversion node. In some implementations, the conversion node corresponds to one of a plurality of nodes of the graph with which the most referrer nodes are linked relative to a number of referrer nodes linked with each of the other nodes of the plurality of nodes.

In some implementations, the method further includes assigning, by the data processing system, each of the nodes corresponding to the information resources of the first group having a same number of edges between each of the nodes and the conversion node to the first group.

In some implementations, the method further includes determining, by the data processing system, a click-through rate threshold, and assigning, by the data processing system, one or more information resources associated with an edge linked to the same referrer node with the edge having a click-through rate greater than the click-through rate threshold to the first group.

In some implementations, the method further includes clustering, by the data processing system, the one or more information resources based on proximity of the one or more nodes corresponding to the one or more information resources to each other in the graph and based on weight of the click-through rates between the one or more nodes.

In some implementations, the assigning the one or more information resources of the plurality of information resources to the first group based on click-through rates of node pairs including the same referrer node and different destination nodes is based on a predetermined hierarchical model of a pages of a website. In some implementations, the constructing of the graph is based on the predetermined hierarchical model of pages of a website.

At least one aspect is directed to a system for automatically generating remarketing lists using conversion metrics of information resources of a website of an advertiser. The system can include an information resource management module executing on a data processing system and configured to identify, for a website corresponding to an advertiser, a plurality of information resources included in the website, at least one of the plurality of information resources corresponding to a landing page of a content item of the advertiser provided for display as a third-party content item and at least one of the plurality of information resources identified as a conversion information resource that is presented responsive to a conversion event, at least one information resource of the website including an online activity reporting script to determine a conversion rate of the at least one information resource. The system can include a visitor management module executing on the data processing system and configured to store in a data structure, via the online activity reporting script, for each of the at least one information resource of the website including the online activity reporting script, a plurality of entries corresponding to visits to the information resource by client devices, each entry of the plurality of entries identifying i) a resource identifier identifying the information resource, and ii) a client identifier identifying the client device visiting the information resource. The system can include a conversion rate determination module executing on the data processing system and configured to determine, for the information resource, a conversion rate based on a first number of client identifiers that visited the information resource and also visited the conversion information resource relative to a second number of client identifiers that visited the information resource. The system can include a remarketing list generation module executing on the data processing system and configured to assign a first information resource of the at least one information resource of the website including the online activity reporting script to a first remarketing list based on the determined conversion rate of the first information resource, the first remarketing list including client identifiers of client devices that visited the first information resource. The remarketing list generation module can further be configured to select, in response to receiving a request for content from one of the client identifiers that accessed the first information resource, a content item for display using the remarketing list.

In some implementations, the conversion rate determination module can determine at least one conversion rate threshold, and the remarketing list generation module can assign the first information resource to the first remarketing list based on the conversion rate of the first information resource relative to the at least one conversion rate threshold.

In some implementations, the remarketing list generation module can assign a second information resource of the at least one information resource of the website including the online activity reporting script to a second remarketing list based on the determined conversion rate of the second information resource relative to the at least one conversion rate threshold, the second remarketing list different from the first remarketing list and including client identifiers of client devices that visited the second information resource.

In some implementations, the conversion rate of the first information resource is greater than the at least one conversion rate threshold and the conversion rate of the second information resource is less than the at least one conversion rate threshold. In some implementations, the conversion rate determination module can calculate a median conversion rate based on the conversion rate of each of the at least one information resource of the website including the online activity reporting script, and the conversion rate determination module can assign the at least one conversion rate threshold to be a multiple of the median conversion rate.

In some implementations, the conversion rate determination module can calculate a mean conversion rate based on the conversion rate of each of the at least one information resource of the website including the online activity reporting script, and the conversion rate determination module can assign the at least one conversion rate threshold based on a multiple of a standard deviation of the mean conversion rate.

In some implementations, the conversion rate determination module can assign one or more information resources having a range of conversion rates bounded by two of the at least one conversion rate threshold to the first remarketing list.

In some implementations, the conversion rate determination module can, for each of the at least one information resource of the web site including the online activity reporting script, determine the conversion rate based on a time limit for conversion between when the client identifiers visited the information resource and when the client identifiers visited the conversion information resource.

In some implementations, the information resource management module can receive for the at least one information resource of the website including the online activity reporting script, data corresponding to at least one of identification of the at least one information resource of the website, identification of a client device that visited the at least one information resource of the website, and a time when the client device visited the at least one information resource of the website. In some implementations, the information resource management module can receive for the conversion information resource of the website, data corresponding to at least one of identification of the conversion information resource of the website, identification of a client device that visited the conversion information resource of the website, and a time when the client device visited the conversion information resource of the website.

At least one aspect is directed to a method for automatically generating remarketing lists using conversion metrics of information resources of a website of an advertiser. The method includes identifying, by a data processing system including one or more processors, for a website corresponding to an advertiser, a plurality of information resources included in the website, at least one of the plurality of information resources corresponding to a landing page of a content item of the advertiser provided for display as a third-party content item and at least one of the plurality of information resources identified as a conversion information resource that is presented responsive to a conversion event, at least one information resource of the website including an online activity reporting script to determine a conversion rate of the at least one information resource. The method includes, for each of the at least one information resource of the website including the online activity reporting script, storing, by the data processing system, in a data structure, via the online activity reporting script, a plurality of entries corresponding to visits to the information resource by client devices, each entry of the plurality of entries identifying i) a resource identifier identifying the information resource, and ii) a client identifier identifying the client device visiting the information resource. The method includes, for each of the at least one information resource of the website including the online activity reporting script, determining, by the data processing system, for the information resource, a conversion rate based on a first number of client identifiers that visited the information resource and also visited the conversion information resource relative to a second number of client identifiers that visited the information resource. The method includes assigning, by the data processing system, a first information resource of the at least one information resource of the website including the online activity reporting script to a first remarketing list based on the determined conversion rate of the first information resource, the first remarketing list including client identifiers of client devices that visited the first information resource. The method includes selecting, in response to receiving a request for content from one of the client identifiers that accessed the first information resource, a content item for display using the remarketing list.

In some implementations, the method further includes determining, by the data processing system, at least one conversion rate threshold, and assigning, by the data processing system, the first information resource to the first remarketing list based on the conversion rate of the first information resource relative to the at least one conversion rate threshold.

In some implementations, the method further includes assigning, by the data processing system, a second information resource of the at least one information resource of the website including the online activity reporting script to a second remarketing list based on the determined conversion rate of the second information resource relative to the at least one conversion rate threshold, the second remarketing list different from the first remarketing list and including client identifiers of client devices that visited the second information resource.

In some implementations, the conversion rate of the first information resource is greater than the at least one conversion rate threshold and the conversion rate of the second information resource is less than the at least one conversion rate threshold.

In some implementations, the method further includes calculating, by the data processing system, a median conversion rate based on the conversion rate of each of the at least one information resource of the website including the online activity reporting script, and assigning, by the data processing system, the at least one conversion rate threshold to be a multiple of the median conversion rate.

In some implementations, the method further includes calculating, by the data processing system, a mean conversion rate based on the conversion rate of each of the at least one information resource of the website including the online activity reporting script, and assigning, by the data processing system, the at least one conversion rate threshold based on a multiple of a standard deviation of the mean conversion rate.

In some implementations, the method further includes assigning, by the data processing system, one or more information resources having a range of conversion rates bounded by two of the at least one conversion rate threshold to the first remarketing list.

In some implementations, the method further includes, for each of the at least one information resource of the website including the online activity reporting script, determining, by the data processing system, the conversion rate based on a time limit for conversion between when the client identifiers visited the information resource and when the client identifiers visited the conversion information resource.

In some implementations, the method further includes receiving, by the data processing system, for the at least one information resource of the website including the online activity reporting script, data corresponding to at least one of identification of the at least one information resource of the website, identification of a client device that visited the at least one information resource of the website, and a time when the client device visited the at least one information resource of the website. In some implementations, the method further includes receiving, by the data processing system, for the conversion information resource of the website, data corresponding to at least one of identification of the conversion information resource of the website, identification of a client device that visited the conversion information resource of the website, and a time when the client device visited the conversion information resource of the website.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6 is a table depicting pages of a website for automatically generating remarketing lists, according to an illustrative implementation.

DETAILED DESCRIPTION

Figure 1:
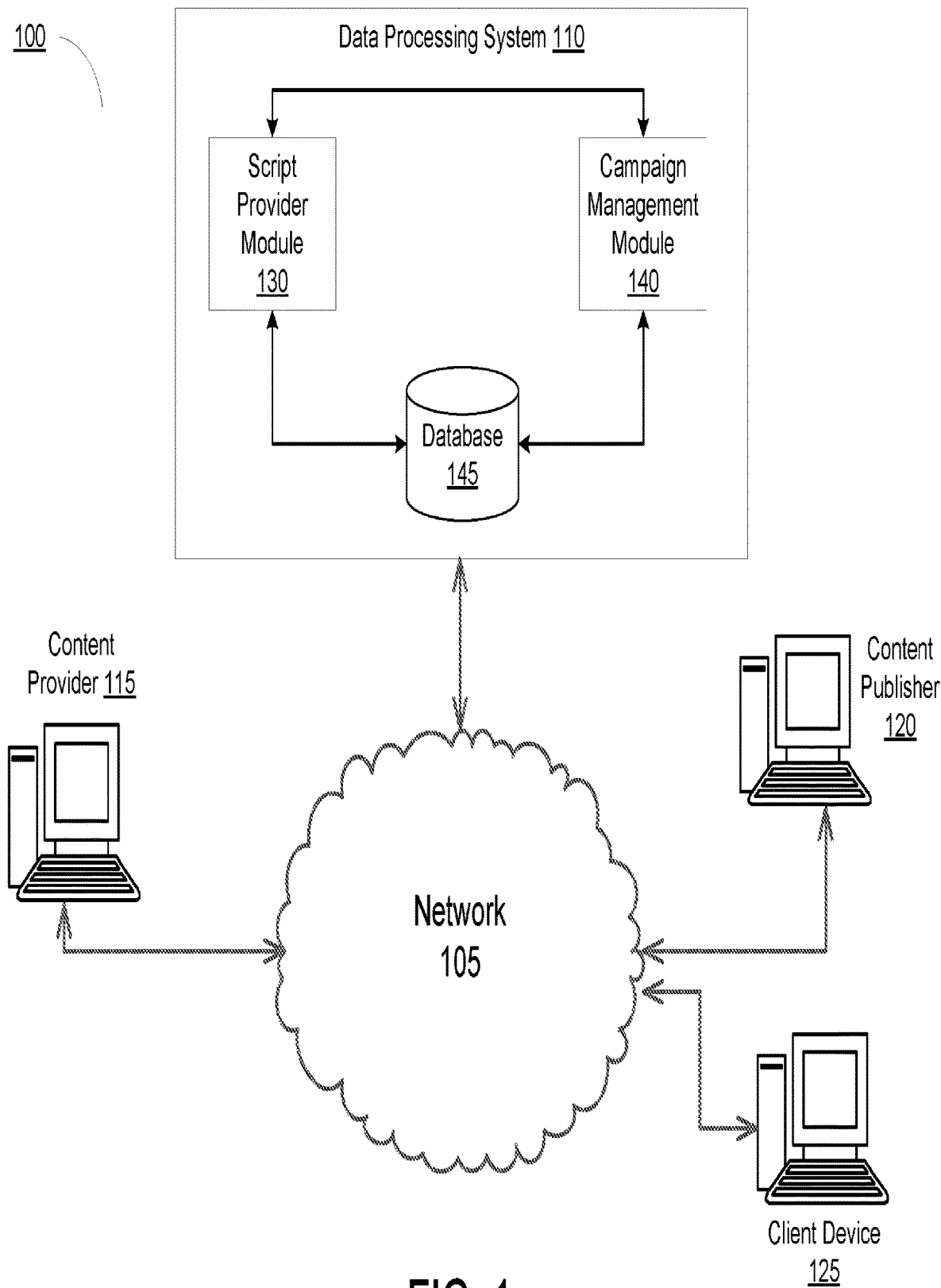
FIG. 1 is a block diagram depicting one implementation of an environment for automatically generating remarketing lists, according to an illustrative implementation.

Following below are more detailed descriptions of various concepts related to, and implementations of, methods, apparatuses, and systems of automatically generating remarketing lists for a website. The various concepts introduced above and discussed in greater detail below may be implemented in any of numerous ways, as the described concepts are not limited to any particular manner of implementation.

Aspects of the present disclosure are directed generally to systems and methods of automatically generating remarketing lists for a content provider (for instance, an advertiser) based on segmentation of the webpages of the content provider's website.

In existing solutions, a content provider may first add an online reporting script (e.g., a small snippet of code of an online activity reporting script) to each of the content provider's webpages. The online reporting script can then report information about a user who visits a tagged page (e.g., the user's cookie ID, the URL of the page, whether the user converts, etc.). Then, the content provider may create a remarketing list based on rules that are formulated by the content provider and may manually enter the rules into a remarketing tool. As an example, a content provider may generate a remarketing list based on customers that added a product to their shopping cart, but did not proceed with the purchase. As another example, a content provider may generate a remarketing list based on customers that visited a particular category of products (e.g., shoes). Accordingly, due to the manual nature of the process, generating a remarketing list may become tedious and time-intensive for a content provider. Furthermore, the granularity and effectiveness of the remarketing lists may be limited by the skill of the individual content providers.

The present disclosure addresses these challenges by utilizing the user and webpage information reported by the online reporting scripts to segment a content provider's website and to create high-value remarketing lists based on the segmentation. The present disclosure can generate the remarketing lists: 1) based on a mapping of the content provider's website, and 2) based on respective conversion metrics of the individual pages of the content provider's website.

In one embodiment that is based on the mapping of the content provider's website, a sequence of URLs visited by all users can be constructed by using information reported by the online reporting scripts of a website's pages (e.g., source to destination URLs that are linked, or times when a user accesses each tagged URL). Using this information, the click-through rates can also be determined between all pairs of tagged URLs, and a directed (based on the URL links) and weighted (based on the click-through rates of the links) graph of the website's URLs can be constructed. Using the graph, the various URL paths to a purchase page URL (indicating a user conversion) can be determined. Accordingly, corresponding remarketing lists can then be associated with URLs having the same distance from the conversion URL. The online reporting script may be an online activity reporting script embedded in one or more information resources of a website. The online activity reporting script includes one or more computer executable instructions that may be configured to execute on a client device 125. The computer executable instructions of the online reporting script can be configured to instruct the client device 125 to report the online activity data of the client device 125 to the content provider 115 or to the data processing system 110.

In another embodiment that is based on the mapping of the content provider's website, the directed and weighted graph of a web site's pages described above may be used to determine categories of products of a website. For example, the links and click-through rates of the graph can be analyzed to infer patterns of user visits and to cluster strongly linked URLs as corresponding to one product. Corresponding remarketing lists can then be associated with the different clusters of the graph to obtain product-specific remarketing lists.

At least some aspects of the present disclosure are directed to systems and methods for automatically generating remarketing lists based on client sessions. The method includes identifying, by a data processing system including one or more processors, a plurality of client sessions established at a website, each client session corresponding to a client device visiting one or more information resources of the website. The method includes determining, by the data processing system, for each of the plurality of client sessions, one or more node pairs, each of the one or more node pairs including a destination node representing a destination information resource and a referrer node representing a referrer information resource corresponding to an information resource from which the client device visited the destination information resource. The method includes constructing, by the data processing system, using the plurality of client sessions, a graph including the determined node pairs and a plurality of edges between the destination nodes and corresponding referrer nodes of the node pairs. Each edge of the plurality of edges between a destination node and a referrer node of a respective node pair can represent a ratio of a first number of client devices that visited the destination information resource from the referrer information resource to a second number of client devices that visited the referrer information resource. The method includes assigning one or more information resources of the plurality of information resources to a first group of information resources based on one of i) a number of edges between the nodes corresponding to the information resources of the first group and a conversion node representing an information resource presented responsive to a conversion event or ii) click-through rates of node pairs including the same referrer node and different destination nodes. The method includes assigning the first group of information resources to a remarketing list including client identifiers of client devices that visited the information resources assigned to the first group of information resources.

In other implementations, because a system can determine whether a user converts based on information reported by the online reporting scripts, a rate of conversion for users that visit a particular page can be determined (i.e., the "tag conversion rate" of each page can be determined). Thus, URLs of a website may be segmented or ranked based on their tag conversion rates. Each of the URLs can be grouped into remarketing lists based on tag conversion rate thresholds. For example, URLs having a relatively high tag conversion rate (e.g., having a tag conversion rate higher than the median tag conversion rate threshold of all the pages) may belong to or otherwise be associated with one remarketing list, and URLs having a relatively low conversion rate (e.g., having a tag conversion rate lower than the median rate threshold) may belong to another remarketing list.

At least some aspects of the present disclosure are directed to systems and methods for automatically generating remarketing lists using conversion metrics of information resources of a website of a content provider. The method includes identifying, by a data processing system including one or more processors, for a website corresponding to an content provider, a plurality of information resources included in the website, at least one of the plurality of information resources corresponding to a landing page of a content item of the content provider provided for display as a third-party content item and at least one of the plurality of information resources identified as a conversion information resource that is presented responsive to a conversion event, at least one information resource of the website including an online activity reporting script to determine a conversion rate of the at least one information resource. The method includes, for each of the at least one information resource of the website including the online activity reporting script, storing, by the data processing system, in a data structure, via the online activity reporting script, a plurality of entries corresponding to visits to the information resource by client devices, each entry of the plurality of entries identifying i) a resource identifier identifying the information resource, and ii) a client identifier identifying the client device visiting the information resource. The method includes, for each of the at least one information resource of the website including the online activity reporting script, determining, by the data processing system, for the information resource, a conversion rate based on a first number of client identifiers that visited the information resource and also visited the conversion information resource relative to a second number of client identifiers that visited the information resource. The method includes assigning, by the data processing system, a first information resource of the at least one information resource of the website including the online activity reporting script to a first remarketing list based on the determined conversion rate of the first information resource, the first remarketing list including client identifiers of client devices that visited the first information resource.

The present solution aims to solve an internet centric problem rooted in computer technology with a solution that is also rooted in computer technology. In particular, the present solution aims to classify client device identifiers based on certain online activity performed by client devices associated with the client device identifiers. In some implementations, the internet centric problem relates to classifying client devices that visit one or more webpages of a content provider's website into one or more different lists. These lists can be used for remarketing, that is, directing additional content items to the client device identifiers based on the list to which the client device identifiers are classified. The additional content items can be used to direct the client device identifiers to the content provider's website to perform additional online activity, which can eventually result in a conversion. In some implementations, the present solution can solve the technical problem of data classification, by classifying pages of a website into various lists such that client device identifiers (or users of client devices) that visit one or more of the pages are included in remarketing lists corresponding to the lists to which the pages are classified, including users that previously visited the pages by utilizing navigation behaviors of users that visit the website and characteristics of the webpages in generating the remarketing lists.

FIG. 1 is a block diagram depicting one implementation of an environment for automatically generating remarketing lists based on client sessions, according to an illustrative implementation. The environment 100 includes at least one data processing system 110. The data processing system 110 can include at least one processor (or a processing circuit) and a memory. The memory stores processor-executable instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language. The data processing system 110 can include one or more computing devices or servers that can perform various functions. In some implementations, the data processing system 110 can include an advertising auction system configured to host auctions. In some implementations, the data processing system 110 does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the environment 100 can communicate via the network 105, for instance with at least one content provider 115, at least one content publisher computing device 120, or at least one client device 125. The network 105 may be any form of computer network that relays information between the client device 125, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 can also include any number of computing devices (e.g., computer, servers, routers, network switches, etc.) that are configured to receive and/or transmit data within network 105. The network 105 can further include any number of hardwired and/or wireless connections. For example, the client device 125 can communicate wirelessly (e.g., via WiFi, cellular, radio, etc.) with a transceiver that is hardwired (e.g., via a fiber optic cable, a CAT5 cable, etc.) to other computing devices in network 105.

The content provider 115 can include servers or other computing devices operated by a content provider entity to provide content items such as advertisements for display on information resources at the client device 125. The content provided by the content provider 115 can include third-party content items or creatives (e.g., ads) for display on information resources, such as a website or web page that includes primary content, e.g., content provided by the content publisher computing device 120. The content items can also be displayed on a search results web page. For instance, the content provider 115 can provide or be the source of advertisements (ads) or other content items for display in content slots of content web pages, such as a web page of a company where the primary content of the web page is provided by the company, or for display on a search results landing page provided by a search engine. The content items associated with the content provider 115 can be displayed on information resources other than web pages, such as content displayed as part of the execution of an application (such as a gaming application, global positioning system (GPS) or map application or other types of applications) on a smartphone or other client device 125. The content provider 115 can be configured to act as a web server for hosting one or more information resources of a website of the content provider. The one or more information resources can be landing pages to which the content items provided by the content provider 115 are linked such that when a client device interacts with a content item of the content provider 115, the client device is directed to an information resource identified as a landing page of the content item.

The content publisher computing device 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider 115. For instance, the content publisher computing device 120 can operate the website of a company and can provide content about that company for display on web pages of the website. The web pages can include content slots configured for the display of third-party content items such as ads of the content provider 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider 115. In some implementations, the content publisher computing device 120 can include a server for serving video content. In some implementations, the content publisher computing device 120 can be the same as the content provider 115.

The client device 125 can include computing devices configured to communicate via the network 105 to display data such as the content provided by the content publisher computing device 120 (e.g., primary web page content or other information resources) and the content provided by the content provider 115 (e.g., third party content items such as ads configured for display in a content slot of a web page). The client device 125, the content provider 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be communication devices through which an end-user can submit requests to receive content. The requests can be requests to a search engine and the requests can include search queries. In some implementations, the requests can include a request to access a web page.

The content provider 115, the content publisher computing device 120 and the client device 125 can include a processor and a memory, i.e., a processing circuit. The memory stores machine instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language.

The content provider 115, the content publisher computing device 120, and the client device 125 can also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices can be internal to a housing of the content provider 115, the content publisher computing device 120 and the client device 125 (e.g., a built-in display, microphone, etc.) or external to the housing of content provider 115, the content publisher computing device 120 and the client device 125 (e.g., a monitor connected to the user computing device 115, a speaker connected to the user computing device 115, etc.), according to various implementations. For example, the content provider 115, the content publisher computing device 120 and the client device 125 can include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider 115. In some implementations, the advertiser can communicate with the data processing system 110 via a user interface displayed on the user interface devices of the content provider 115.

The data processing system 110 can include at least one server. For instance, the data processing system 110 can include a plurality of servers located in at least one data center or server farm. In some implementations, the data processing system 110 can include a third-party content placement system, e.g., an ad server or ad placement system. The data processing system 110 can include at least one script provider module 130, at least one campaign management module 140, and at least one database 145. The script provider module 130 and the campaign management module 140 each can include at least one processing unit, server, virtual server, circuit, engine, agent, appliance, or other logic device such as programmable logic arrays configured to communicate with the database 145 and with other computing devices (e.g., the content provider 115, the content publisher computing device 120, or the client device 125) via the network 105.

The script provider module 130 and the campaign management module 140 can include or execute at least one computer program or at least one script. The script provider module 130 and the campaign management module 140 can be separate components, a single component, or part of the data processing system 110. The script provider module 130 and the campaign management module 140 can include combinations of software and hardware, such as one or more processor configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, portions of webpages, third-party content items (e.g., advertisements), and online reporting script, among others, to serve to content provider 115 or client device 125.

The script provider module 130 can be configured to retrieve an online reporting script (or online activity reporting script) from the database 145 and transmit the retrieved script to the content provider 115 (or to another entity for sending to the content provider 115). The script may be embedded into code of each webpage on the website of the content provider 115. For instance, an administrator at the content provider 115 may manually insert the online reporting script into code used to generate or render each page of the website of the content provider, or into select pages of the content provider, as desired.

The online reporting script can include computer-executable instructions that are executable by one or more processors. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed within an application of the content provider 115, such as the application that caused the content provider 115 to generate webpages transmitted over the network 105 to the client device 125. The application can include, for example, an Internet browser, a mobile application, a gaming application, a GPS application, or any other computer program capable of reading and executing the computer-executable instructions.

The computer-executable instructions of the online reporting script, when executed by a processor of the content provider 115, can cause an application of the content provider 115 to transmit data regarding the pages of the website (e.g., those pages including the script) of the content provider 115 to the data processing system 110. For instance, the computer-executable instructions can transmit data such as, but not limited to, an identifier of a current information resource of the website (e.g., a URL), an identifier of a referrer information resource to the current information resource of the website (e.g., a URL from which a user arrived at the current information resource), an identifier of a conversion information resource of the website (e.g., a URL that is presented to the client device 125 responsive to a conversion event initiated by the client device 125), or a time at which a client device accessed the current information resource, an identifier of the client device (e.g., a cookie ID assigned to the visiting client device or associated entity, or the like) that visited the current information resource, the referrer information resource, or the conversion information resource. In some implementations, the information resource identifier can be a URL. In some implementations, the information resource identifier can be a domain to which the information resource belongs. In some implementations, the information resource identifier can be an IP address corresponding to a server hosting the information resource.

In some implementations, the script provider module 130 can receive a request for the online reporting script from the content provider 115 via the network 105. In response to receiving the request, the script provider module 130 may access the database 145 to retrieve the online reporting script and may transmit data including the online reporting script to the content provider 115.

In some implementations, as described above, each page of a website of the content provider can include the online reporting script. In some implementations, the online reporting script can be inserted by the data processing system 110 directly without any action required by the content publisher computing device or the content provider. The online reporting script can be configured to execute on a client device 125 of a client that accesses the website of the content provider 115. In some implementations, a browser can execute on the client device 125. The browser can be configured to execute one or more computer-executable instructions corresponding to the online reporting script embedded or inserted within the web page of the content provider. The online reporting script can cause the client device 125 to transmit data to one or more of the content provider 115 or the data processing system 110. In some implementations, the online reporting script inserted within a webpage of a website of the content provider computing system 115 can be executed by a processor of the client device 125. The processor of the client device 125 can execute the online reporting script as the processor executes one or more other computer-executable instructions included in the webpage. The processor, by executing the online reporting script, can be caused to identify visit related data, regarding the visit to the webpage to. In particular, the data can include an identifier of a current information resource of the website (e.g., a URL), an identifier of a referrer information resource to the current information resource of the website (e.g., a URL from which a user arrived at the current information resource), an identifier of a conversion information resource of the website (e.g., a URL that is presented to the client device 125 responsive to a conversion event initiated by the client device 125), or a time at which a client device 125 visited the current information resource, an identifier of an entity associated with the client device 125 (e.g., a cookie ID assigned to the visiting client device, or the like) that visited the current information resource, the referrer information resource, or the conversion information resource. In some implementations, the information resource identifier can be a URL. In some implementations, the information resource identifier can be a domain to which the information resource belongs. In some implementations, the information resource identifier can be an IP address corresponding to a server hosting the information resource. The processor, by executing the online reporting script, can be caused to transmit the visit related data to the data processing system 110 or the content provider 115. The processor can transmit the visit related data via a BEACON request. In some implementations, the processor can transmit the visit related data automatically without a user of the computing device taking any additional actions.

In some implementations, the campaign management module 140 can be configured to receive data from one or more client devices 125 that accessed one information resources that include the online reporting script provided by the script provider module 125. In some implementations, the campaign management module 140 can be configured to receive data from the content provider 115 corresponding to information resources that include the online reporting script of a website of the content provider 115. The campaign management module 140 can perform various operations and functions with respect to the received data to generate optimally tailored remarketing lists based on the information resources of the website of the content provider 115. Further details regarding the operations of the campaign management module 140 are described below, in particular, in connection with FIGS. 2 and 5.

A. Website Mapping

Figure 2:
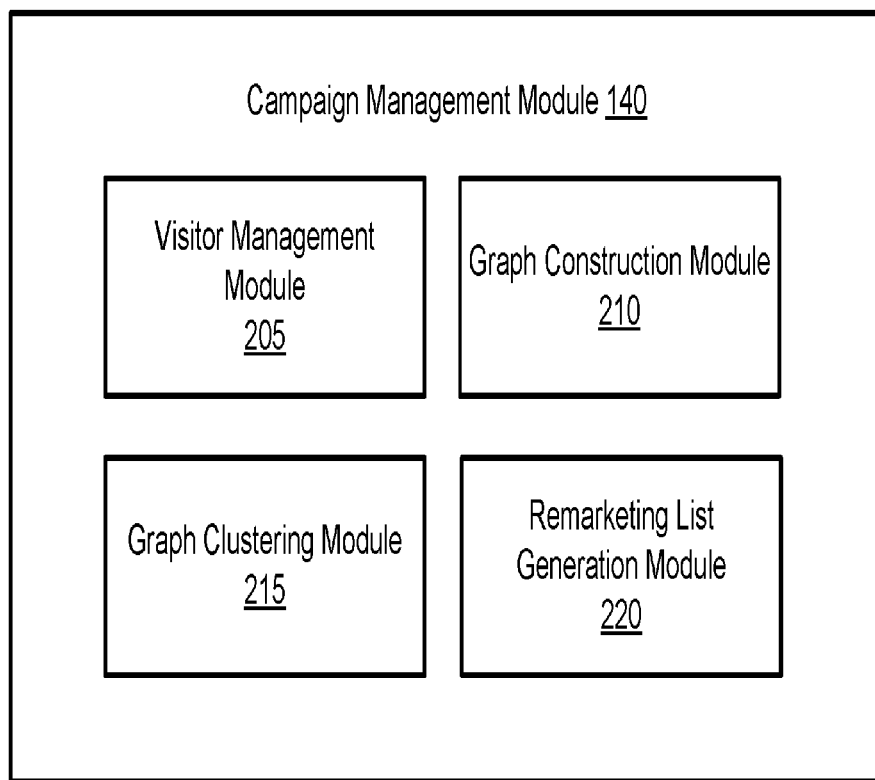
FIG. 2 is a block diagram depicting one implementation of a campaign management module, according to an illustrative implementation.

FIG. 2 is a block diagram depicting one implementation of a campaign management module, according to an illustrative implementation. The campaign management module 140 can include a plurality of sub-modules including a visitor management module 205, a graph construction module 210, a graph clustering module 215, and a remarketing list generation module 220. The campaign management module 140 can be run or otherwise be executed by one or more processors of a computing device, such as those described below in FIG. 8.

In some implementations, upon accessing a website of the content provider 115, the client device 125 can execute the online reporting script that is embedded or otherwise included in the code of pages of the website. For instance, a web browser of the client device 125 may load a page having the embedded online reporting script, and when the page loads on the client device 125, instructions of the online reporting script can be executed at the client device 125. The instructions can cause the client device 125 to identify and transmit visit related data pertaining to the visit to the page to the data processing system 110.

In some implementations, the data processing system 110 can provide a system for automatically generating remarketing lists based on client sessions. The visitor management module 205 can execute on the data processing system 110 and be configured to identify a plurality of client sessions of client devices that visited a website of the content provider 115. The client sessions can correspond to client devices 125 visiting one or more information resources of the website of the content provider 115. In some implementations, a client session corresponding to a client device 125 can be determined (e.g., by the data processing system 110 or by the content provider 115) based on the number of webpages visited by the client device 125. For example, a client session can be identified in response to the client device 125 visiting a single webpage of a website, or in response to the client device 125 visiting a number of pages greater than a threshold (e.g., two or more pages of a website). In some implementations, the information resources that include the embedded online reporting script may trigger the client device 125 to transmit (e.g., to the data processing system 110) identification information of a client device 125 corresponding to the client session based on visits of the client device 125 to those information resources. Accordingly, the online reporting scripts provide the visit-related data to the data processing system 110 so that the data processing system 110 can determine the navigation path information of the client device 125 during the client session.

In some implementations, the online reporting script executes on the client device and can trigger the client device 125 to transmit an identifier of the information resources that are visited, times when the information resources were visited, an identifier of the client device 125 that visited the information resources, or the like. The data processing system 110, in conjunction with the information resources including the online reporting script, can determine a plurality of navigation paths corresponding to a plurality of client sessions, and the visitor management module 205 can aggregate the navigation path data (e.g., by sorting and organizing the data into a table of entries).

The visitor management module 205 can determine for each of the plurality of client sessions, one or more node pairs, each of the one or more node pairs including a destination node representing a destination information resource and a referrer node representing a referrer information resource corresponding to an information resource from which the client device visited the destination information resource. In some implementations, because the online reporting scripts instruct the client device 125 to transmit identifier information of a referrer information resource and an information resource from which the referrer information resource is linked, based on the determined navigation paths of the client devices, the visitor management module 205 can determine discrete pairs of information resources of the content provider 115 that are directly linked. For instance, one pair of information resources can include a referrer information resource and a destination information resource to which the referrer information resource is linked, and the visitor management module 205 can enter the referrer information resource and destination information resource into a table of entries for subsequent access (described further below). Accordingly, the visitor management module 205 can assign pairs of information resources to be corresponding pairs of nodes.

In some implementations, a graph construction module 210 can execute on the data processing system 110 and be configured to construct, using the plurality of client sessions, a graph including the determined node pairs and a plurality of edges between the destination nodes and corresponding referrer nodes of the node pairs. In addition to determining nodes that are linked based on the determined plurality of client sessions, the graph construction module 210 can determine the links between the determined nodes. The links between the nodes can be referred to as the edges. For instance, in response to a client device 125 accessing a first information resource of the website of the content provider 115, and in response to the client device 125 accessing a second information resource of the website via the first information resource (e.g., by the client device 125 accessing a hyperlink on the first information resource), the graph construction module 210 (or the visitor management module 205) can determine a first node corresponding to the first information resource and a second node corresponding to the second information resource and that an edge or link exists between the first and second information resources. Once the graph construction module 210 receives enough client session information and enough node pairs (e.g., from the visitor management module 205), the graph construction module 210 can construct a graph that includes the nodes corresponding to the visited information resources of the website and the edges between each of the nodes. For instance, if the graph construction module 210 receives information identifying a plurality of information resources, the graph construction module 210 can compare the number of identified information resources to a threshold before constructing the graph. If the number exceeds the threshold, the graph construction module 210 can initiate graph construction.

In some implementations, the graph construction module 210 (or the visitor management module 205) can receive, for example, the identifiers of visited pages of a website, client identifiers of client devices 125 that visited the pages, times of visits, referrer pages, etc. In some implementations, in response to this received information, the graph construction module 210 (or the visitor management module 205) can organize the data as entries in a table. For instance, an online activity table maintained by the data processing system 110 can have entries corresponding to a referrer URL, a destination URL accessed from the referrer URL, the times a client device 125 visited the referrer and destination URLs, the identity of the client device 125, and so on. For instance, each time a client device 125 visits a page of the website, the client device 125 can send visit-related data to the data processing system 110. In response to the received data, the data processing system 110 can create an entry in the stored table corresponding to the received visit-related data.

In some implementations, the data processing system 110 may generate a second table for storing information based on analyses of the first table including the received data. For instance, based on analysis of referrer URLs and destination URLs, the graph construction module 210 can determine whether edges exist between particular URLs. In some implementations, further based on the client identifiers of the client devices 125, the graph construction module 210 can determine the client devices that reached a referrer URL but not a destination URL and those that reached the destination URL from the referrer URL to determine a click-through rate. Accordingly, the second table can include the calculated results based on the data of the first table (e.g., click-through rates between nodes).

In some implementations, each edge of the plurality of edges between a destination node and a referrer node of a respective node pair can represent a ratio of a first number of client devices that visited the destination information resource from the referrer information resource to a second number of client devices that visited the referrer information resource. The graph construction module can further determine click-through rates corresponding to each edge. For instance, because the campaign management module 140 receives information identifying the client devices 125 and information regarding which information resources the client device 125 navigated to, the graph construction module 210 can determine a ratio of visitors that accessed a first information resource (e.g., a referrer information resource) to visitors that accessed a destination information resource (e.g., an information resource to which the referrer information resource is linked to). In other words, the graph construction module 210 can determine the click-through rate of a node pair based on the aggregated navigation paths of the client sessions to determine the percentage of visitors that accessed one information resource from another referrer information resource. As such, the graph construction module 210 can assign click-through rates to each of the edges of the graph (e.g., enter the determined click-through rates into a stored table), which are represented by the determined ratios.

In some implementations, the graph construction module 210 can omit from the graph at least one edge of the plurality of edges, and a node pair associated with the at least one edge, having a ratio below a ratio threshold. The graph construction module 210 can store a predetermined threshold, or can automatically set a threshold, for click-through rates of edges of the graph. The graph construction module 210 can compare each of the click-through rates corresponding to each edge, and omit or prune edges from the graph having a click-through rate below the threshold. In some implementations, the graph construction module 210 can also prune the source and destination nodes at the ends of the edge having a click-through rate below the threshold from the graph. Accordingly, the graph construction module 210 can construct a graph having nodes that are frequently visited by visitors (e.g., those associated with edges having click-through rates above the threshold), and can prune those nodes that are infrequently visited (e.g., those associated with edges having click-through rates below the threshold), as the relatively infrequently visited nodes may produce inaccurate website mapping and clustering if included in the graph.

In some implementations, the graph clustering module 215 can execute on the data processing system 110 and can be configured to assign one or more information resources of the plurality of information resources to a first group of information resources. With entries of the tables corresponding to the website of the content provider 115, the graph clustering module 215 can analyze the tables for patterns or relevant characteristics of the information resources or nodes represented in the graph for grouping or clustering.

In some implementations, the graph clustering module 215 can cluster the graph based on a number of edges between the nodes corresponding to the information resources of the first group and a conversion node representing an information resource presented responsive to a conversion event. The visitor management module 205 can identify, based on the plurality of client sessions, a conversion information resource of the website of the content provider 115. The conversion information resource can correspond to a page of the website that indicates that a client device 125 converted. For instance, a website may include a purchase confirmation page, which would indicate that the client device 125 converted (by purchasing an item) during the client session.

In some implementations, the visitor management module 205 can identify the conversion information resource based on the number of referrer information resources linked to the conversion page. For instance, a conversion page of a website may have the most referrer pages linked (directly or indirectly) to the conversion page because all product pages may terminate at the purchase confirmation or conversion page. In addition, the conversion information resource can be a page of the website that is relatively downstream in the sequence of the nodes since a client session may typically terminate at the purchase confirmation screen. Accordingly, the visitor management module 205 can identify a conversion information resource based on the structure of the graph (e.g., based on the number of referrer pages of a page or based on how far downstream the page is in the graph). In some implementations, an administrator of the content provider 125 can flag or indicate the conversion information resource, and the visitor management module 205 can receive this information identifying the conversion page.

In some implementations, the graph clustering module 215 can group or cluster nodes of the graph based on the distance a node is from the conversion node that corresponds to the conversion information resource. For instance, the graph clustering module 215 can group or cluster nodes of the graph based on the number of tiers or levels of nodes or edges between a given node and the conversion node. For example, the graph clustering module 215 can group or cluster all nodes that have three tiers or levels of edges between the nodes and the conversion node into a first group, all nodes that have five tiers of edges between the nodes and the conversion node into a second group, all nodes that have two tiers of edges between the nodes and the conversion node into a third group, and so on. In some implementations, the graph clustering module 215 can cluster based on ranges of distances between nodes and the conversion node. For instance, the graph clustering module 215 can group all nodes that have three to five tiers of edges between the nodes and the conversion node, can group all nodes that have six to nine tiers of edges between the nodes and the conversion node, and so on. In some implementations, the distance between a node and a conversion node can be the least number of edges to get from the node to the conversion node.

In some implementations, the graph clustering module 215 can cluster the graph based on the click-through rates of node pairs including the same referrer node and different destination nodes. For example, the graph clustering module 215 can identify a referrer node and a plurality of different destination nodes linked to the common referrer node via different edges. The graph clustering module 215 can compare each of the click-through rates of the different edges with a threshold value in determining whether the nodes associated with an edge should be clustered. For instance, the higher a click-through rate is, the more strongly related the pair of nodes associated with the edge may be. So, if each of the click-through rates of the plurality of edges between the common referrer node and the destination nodes exceeds the threshold value, the graph clustering module 215 may cluster the common referrer node and the destination nodes into a group. The graph clustering module 215 can alternatively group nodes of a graph based on distances of nodes from other nodes, click-through rates of edges, proximity of the nodes to each other, or the like, to group nodes that are similar to each other (e.g., groupings of nodes that correspond to a categories of products or items sold on the website). In some implementations, the graph clustering module 215 can utilize a clustering algorithm for identifying groups of similar information resources. The graph clustering module 215 can utilize clustering algorithms, such as, but not limited to, connectivity-based clustering (hierarchical clustering), centroid-based clustering, distribution-based clustering, density-based clustering, or the like. In some implementations, the clustering analysis can compute a clustering score of a group of nodes and compare the score with a threshold to determine whether the group of nodes should be clustered.

Connectivity-based clustering is based on the core idea of objects being more related to nearby objects than to objects farther away. Connectivity-based clustering can connect "objects" to form "clusters" based on their distance. A cluster can be described largely by the maximum distance needed to connect parts of the cluster. At different distances, different clusters can form. Connectivity-based clustering is a whole family of methods that differ by the way distances are computed. In some implementations, apart from the distance functions, the linkage criterion to use must be identified (e.g., since a cluster consists of multiple objects, there are multiple candidates to compute the distance to). In some implementations, linkage criteria choices can be single-linkage clustering (e.g., the minimum of object distances), complete linkage clustering (e.g., the maximum of object distances), or Unweighted Pair Group Method with Arithmetic Mean (UPGMA), also known as average linkage clustering. Furthermore, hierarchical clustering can be agglomerative (e.g., starting with single elements and aggregating them into clusters) or divisive (e.g., starting with the complete data set and dividing it into partitions).

In centroid-based clustering, clusters can be represented by a central vector, which may not necessarily be a member of the data set. When the number of clusters is fixed to k, k-means clustering gives a formal definition as an optimization problem: find the k cluster centers and assign the objects to the nearest cluster center, such that the squared distances from the cluster are minimized.

Figure 3:
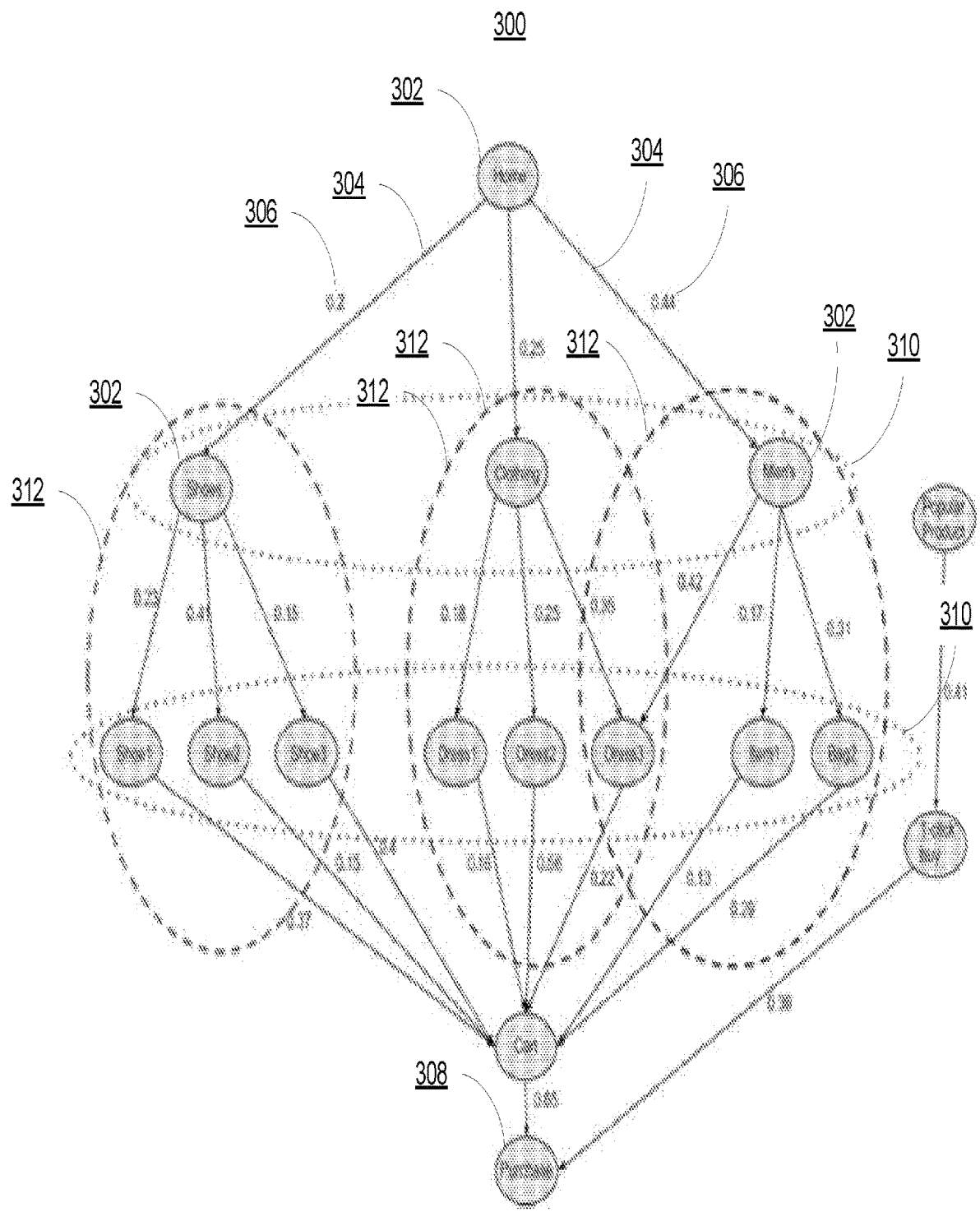
FIG. 3 is a graph depicting pages of a website for automatically generating remarketing lists, according to an illustrative implementation.

Distribution-based clustering can be based on distribution models. For instance, in some implementations, the graph clustering module 215 may utilize a predetermined hierarchical model of pages of a website as a distribution model. For instance, a typical website may follow a diamond shape, as shown in FIG. 3, which can be used as a hierarchical model. In some implementations, clusters can then be defined as objects belonging most likely to the same distribution. A convenient property of this approach is that this closely resembles the way artificial data sets are generated: by sampling random objects from a distribution.

In density-based clustering, clusters can be defined as areas of higher density than the remainder of the data set. Objects in these sparse areas—that are required to separate clusters—are usually considered to be noise and border points. In some implementations, density-based clustering can feature a well-defined cluster model called "density-reachability." Similar to linkage-based clustering, density-based clustering can be based on connecting points within certain distance thresholds.

The remarketing list generation module 220 can execute on the data processing system 110 and can be configured to assign the first group of information resources to a remarketing list. In some implementations, the remarketing list can include client identifiers of client devices that visited the information resources assigned to the first group of information resources. The remarketing list generation module 220 can assign the groups of related information resources identified by the graph clustering module 215 to separate remarketing lists. The remarketing list generation module 220 can then assign, to a particular remarketing list to which a first group of information resources are assigned, a list of client identifiers of the client devices that visited the first group of information resources, as determined by the visitor management module in conjunction with the online reporting scripts embedded in the code of the pages of the websites. In some implementations, the remarketing list generation module 220 can assign the information resources to the remarketing list based on the distance of the information resources from an identified conversion page. In some implementations, the remarketing list generation module 220 can assign the information resources to the remarketing list based on grouping or clustering of the information resources (e.g., based on click-through rates).

The remarketing list generation module 220 can execute on the data processing system 110 and can be configured to assign the client identifiers that accessed the first group of information resources to the remarketing list. The remarketing list generation module 220 can access the table of entries to determine those client identifiers that accessed the information resources of the first group, and the remarketing list generation module 220 can assign these client identifiers to the remarketing list. In some implementations, when a client device 125 visits multiple information resources of the website, the remarketing list generation module 220 can assign the client identifier of the client device 125 to a remarketing list based on the information resource visited by the client device 125 that is closest to the conversion information resource.

In some implementations, the remarketing list generation module 220 can select, in response to receiving a request for content from one of the client identifiers that accessed the first group of information resources and that is assigned to a remarketing list, a content item for display using the remarketing list. The remarketing list generation module 220 can compare the client identifier (e.g., cookie ID) of the requesting client device 125 with those of one or more remarketing lists stored on the data processing system 110. If the requesting client identifier matches a stored client identifier of a remarketing list, the data processing system 110 can perform a remarketing function with respect to the client device 125 identified by the client identifier. For instance, the data processing system 110 can send for display a content item to the client device 125 based on the remarketing list on which the client identifier of the client device 125 was found (e.g., the data processing system 110 can send an advertisement to the client device 125 based on the remarketing list the client device 125 is associated with).

FIG. 3 is a graph depicting pages of a website for automatically generating remarketing lists, according to an illustrative implementation. The graph 300 includes a plurality of information resource nodes 302 of a represented website that can be generated by the campaign management module 140. One of the nodes can be identified as a conversion node 308. Each of the nodes 302 are attached to one or more edges 304. Each edge 304 includes a corresponding click-through rate 306 indicating the click-through rate from the referrer node attached to an edge 304 to the destination node attached to the same edge 304. In addition, the graph 300 illustrates two distinct variations of clusters or groups of nodes: a horizontal cluster 310 and a vertical cluster 312.

In some implementations, the graph construction module 210 can identify the conversion node 308 based on a number of referral nodes directly or indirectly linked to a destination node. For instance, the graph construction module 210 can identify the conversion node 308 of a website by determining which node of the plurality of nodes of the website has the most referrer pages linked (directly or indirectly). In some implementations, an administrator of the content provider 125 can flag or indicate the conversion node, and the visitor management module 205 can receive this information identifying the conversion page. In some implementations, the graph construction module 210 can identify the conversion node 308 based on a ratio of referrer nodes to destination nodes of each of the nodes, and if a ratio of a node exceeds a threshold value or if the ratio of the node is the highest ratio of ratio of all the nodes, the node can be identified as the conversion node 308.

The graph 300 illustrates an example of a directed and weighted graph representing a website of a content provider 115. Furthermore, the graph 300 depicts how the graph 300 can be used to generate remarketing lists. For example, each of the two horizontal clusters 310 corresponds to a remarketing list in which the circled nodes have the same distance from the conversion page (e.g., the pages "shoes," "clothing," and "men's" are each at a same distance from the conversion page "purchase," each node in the cluster being three tiers of edges from the conversion node 308). Accordingly, the horizontal clusters 310 are determined based on the distances to conversion of the nodes. Alternatively, each of the three vertical clusters 312 corresponds to a remarketing list in which the circled nodes are related to a same product category (e.g., the pages "shoes," "shoe1," shoe2," and "shoe3" are each associated with a same product category), based on clustering of similar pages represented by the nodes.

After construction of the graph 300, the graph 300 can be stored at the campaign management module 140 for cluster analysis. In some implementations, the graph 300 can be stored using any suitable graph data model, such as, but not limited to, Resource Description Framework (RDF). The RDF data model is based upon the idea of making statements about resources (in particular web resources) in the form of subject-predicate-object expressions. These expressions are known as triples in RDF terminology. The subject denotes the resource, and the predicate denotes traits or aspects of the resource and expresses a relationship between the subject and the object. A collection of RDF statements intrinsically represents a labeled, directed multi-graph.

Figure 4:
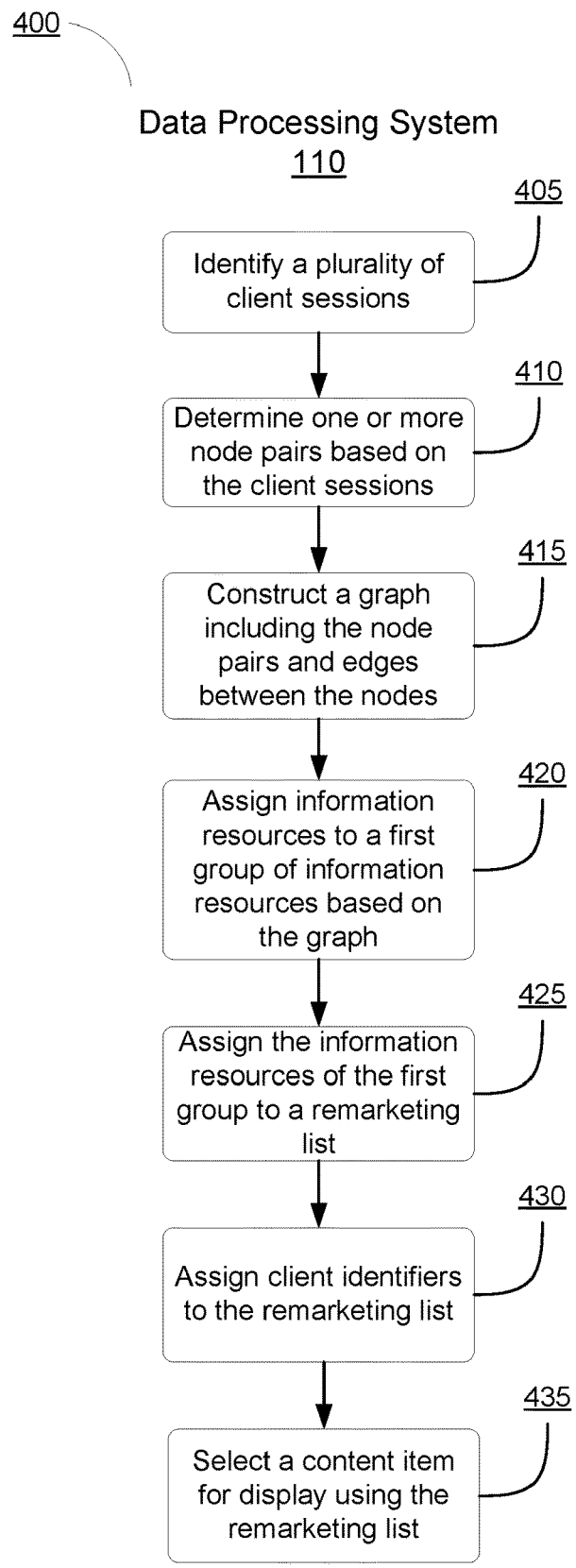
FIG. 4 is a flow diagram depicting a method of automatically generating remarketing lists, according to an illustrative implementation.

FIG. 4 is a flow diagram depicting a method 400 of automatically generating remarketing lists, according to an illustrative implementation. In brief overview, the method 400 can include a data processing system identifying a plurality of client sessions (BLOCK 405). The method 400 can include the data processing system determining one or more node pairs based on the client sessions (BLOCK 410). The method 400 can include the data processing system constructing a graph including the node pairs and edges between the nodes (BLOCK 415). The method 400 can include the data processing system assigning information resources to a first group of information resources based on the graph (BLOCK 420). The method 400 can include the data processing system assigning the information resources of the first group to a remarketing list (BLOCK 425). The method 400 can include the data processing system assigning client identifiers that accessed the first group of information resources (BLOCK 430). The method 400 can include the data processing system selecting a content item for display using the remarketing lust (BLOCK 435).

In further detail, the method 400 can include the data processing system identifying a plurality of client sessions (BLOCK 405). In some implementations, the visitor management module 205 can identify the plurality of client sessions. The client sessions can correspond to client devices visiting one or more information resources of a website of a content provider. The client sessions allow the data processing system to determine the navigation path information on the website of the client devices during the client sessions.

The method 400 can include the data processing system determining one or more node pairs based on the client sessions (BLOCK 410). The data processing system can determine for each of the plurality of client sessions, one or more node pairs. Each of the one or more node pairs can include a destination node representing a destination information resource and a referrer node representing a referrer information resource corresponding to an information resource from which the client device visited the destination information resource. For instance, the one pair of information resources can include a referrer information resource and a destination information resource to which the referrer information resource is linked.

In some implementations, the method 400 can include creating a table of entries based on received visit-related information. The table can include data related to online activity and can be maintained by the data processing system 110. The table can have entries corresponding to a referrer URL, a destination URL accessed from the referrer URL, the times a client device 125 visited the referrer and destination URLs, the identity of the client device 125, and so on. The method 400 can include identifying a conversion node based on the table of entries based on numbers of referrer nodes that are linked to destination nodes, and the method 400 can include identifying the conversion node based on a maximum number of referrer nodes that are linked to a destination node. In some implementations, the identifying the conversion node can be based on ratios of referrer nodes to destination nodes of each of the nodes.

The method 400 can include the data processing system constructing a graph including the node pairs and edges between the nodes (BLOCK 415). The data processing system can construct, using the plurality of client sessions, a graph including the determined node pairs and a plurality of edges between the destination nodes and corresponding referrer nodes of the node pairs. For instance, in response to a client device accessing a first information resource of the website of the content provider, and in response to the client device accessing a second information resource of the website via the first information resource, the data processing system can determine a first node corresponding to the first information resource and a second node corresponding to the second information resource and that an edge or link exists between the first and second information resources.

The data processing system can further determine a ratio of a first number of client devices that visited the destination information resource from the referrer information resource to a second number of client devices that visited the referrer information resource of each edge of the plurality of edges between a destination node and a referrer node of a respective node pair. This ratio can represent a click-through rate between the nodes of the node pair. The data processing system can omit from the graph at least one edge of the plurality of edges, and a node pair associated with the at least one edge, having a ratio below a ratio threshold. In some implementations, the method 400 can include generating a second table for storing information based on analyses of the first table of entries including the received visitor data. For instance, based on analysis of referrer URLs and destination URLs, the method 400 can include determining whether edges exist between particular URLs. In some implementations, further based on the client identifiers of the client devices 125, the method 400 can include determining the client devices that reached a referrer URL but not a destination URL and those that reached the destination URL from the referrer URL to determine a click-through rate.

The method 400 can include the data processing system assigning information resources to a first group of information resources based on the graph (BLOCK 420). The data processing system can cluster the graph based on a number of edges between the nodes corresponding to the information resources of the first group and a conversion node representing an information resource presented responsive to a conversion event. Alternatively, the data processing system can cluster the graph based on the click-through rates of node pairs including the same referrer node and different destination nodes. For instance, the data processing system can cluster the nodes based on locations of the nodes, click-through rates of edges, proximity of the nodes to each other, or the like to group nodes that are similar to each other. In some implementations, the data processing system can utilize a clustering algorithm for identifying groups of similar information resources of the graph.

The method 400 can include the data processing system assigning the information resources of the first group to a remarketing list (BLOCK 425). In some implementations, the remarketing list can include client identifiers of client devices that visited the information resources assigned to the first group of information resources. The data processing system can assign the different groups of related information resources to separate remarketing lists.

The method 400 can include the data processing system assigning client identifiers that accessed the first group of information resources to the remarketing list (BLOCK 430). The method 400 can include accessing the table of entries to determine those client identifiers that accessed the information resources of the first group. The method 400 can include assigning these client identifiers to the remarketing list. In some implementations, the method 400 can include, when a client device visits multiple information resources of the website, assigning the client identifier of the client device to a remarketing list based on the information resource visited by the client device that is closest to the conversion information resource.

The method 400 can include the data processing system selecting a content item for display using the remarketing list (BLOCK 435). The method 400 can include comparing the client identifier (e.g., cookie ID) of a requesting client device with those of one or more remarketing lists stored on the data processing system. If the requesting client identifier matches a stored client identifier of a remarketing list, the method can include performing a remarketing function with respect to the client device identified by the client identifier. For instance, the method 400 can include sending for display a content item to the client device based on the remarketing list on which the client identifier of the client device 125 was found. For instance, the content item can be an advertisement.

B. Website Conversion Metrics

Figure 5:
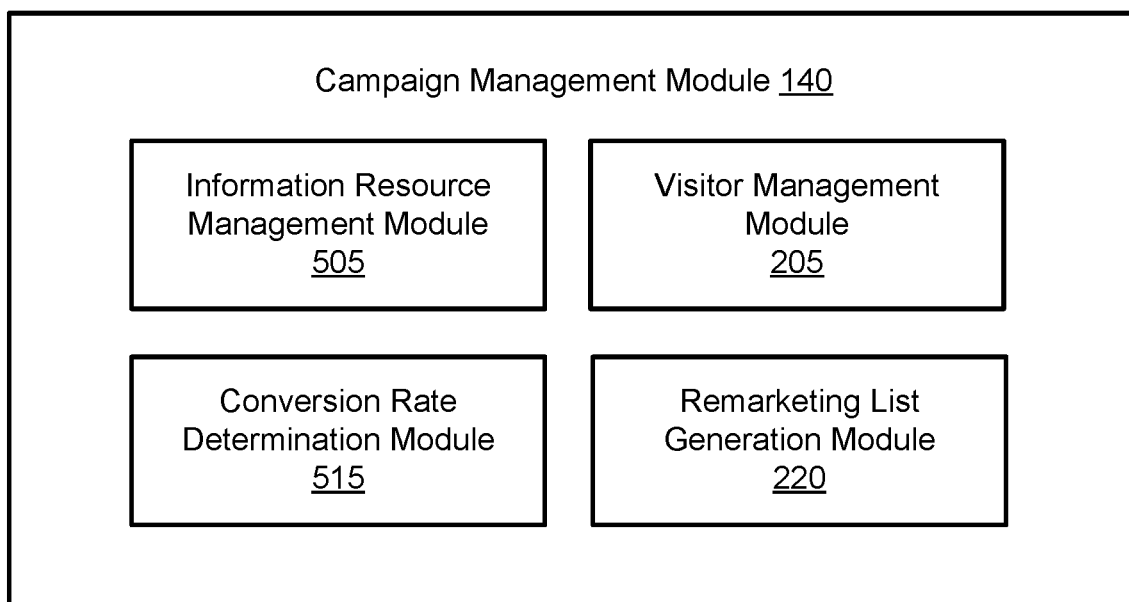
FIG. 5 is a block diagram depicting one implementation of a campaign management module, according to an illustrative implementation.

FIG. 5 is a block diagram depicting one implementation of a campaign management module, according to an illustrative implementation. In some implementations, the campaign management module 140 includes an information resource management module 505, the visitor management module 205, a conversion rate determination module 515, and the remarketing list generation module 220. The campaign management module 140 can include some or all of the sub-modules described in connection with FIG. 2 in addition to the modules 505, 205, 515, and 220.

In some implementations, the information resource management module 505 can execute on the data processing system 110 and can be configured to identify, for a website corresponding to a content provider 115, the plurality of information resources included in the website. The information resource management module 505 may provide the same functions and operations as the visitor management module 205, and thus can identify client devices 125 that visit the website, the pages of the website, and so on.

At least one of the plurality of information resources can correspond to a landing page of a content item of the advertiser provided for display as a third-party content item. The landing page can be one of the information resources of the advertiser's website. The advertisement can be generated by the content provider 115 for display at the content publisher computing device 120.

In some implementations, at least one of the plurality of information resources can be identified as a conversion information resource that is presented responsive to a conversion event. As described above in connection with the visitor management module 205, the information resource management module 505 can identify a conversion information resource of the website of the content provider 115 (e.g., by designation by the content provider 115 or by analyzing a mapping of the website of the content provider 115). In some implementations, at least one information resource of the website can include an online activity reporting script to report online activity corresponding to a client device 125 to the data processing system or the content provider 125 for determining a conversion rate of the at least one information resource. In some implementations, the online activity reporting script can correspond to the online activity reporting script described above, and can be embedded into the code of one or more pages of a website.

In some implementations, the visitor management module 205 can execute on the data processing system 110 and can store in a data structure, via the online activity reporting script, for each of the at least one information resource of the website including the online activity reporting script, a plurality of entries corresponding to visits to the information resource by client devices. The plurality of entries can be stores as a table. In some implementations, each entry of the plurality of entries can identify a resource identifier identifying the information resource, and a client identifier identifying the client device visiting the information resource. As described above in connection with FIG. 2, the visitor management module 205 can identify one or more of the client devices 125 that visits a page of the website including the online activity reporting script, and identify the information resources that were visited by the client devices 125, and other information associated with the visits (e.g., time of visit, referrer information resources, and the like). This information corresponds to the visit-related information received by the visitor management module 205 described above in connection with FIG. 2.

In some implementations, the information resource management module 505 can receive for the at least one information resource of the website including the online activity reporting script, data corresponding to identification of the at least one information resource of the website, identification of a client device 125 that visited the at least one information resource of the website, and a time when the client device 125 visited the at least one information resource of the website. In some implementations, the information resource management module 505 can receive for the conversion information resource of the website, data corresponding to identification of the conversion information resource of the website, identification of a client device 125 that visited the conversion information resource of the website, and a time when the client device 125 visited the conversion information resource of the website.

In some implementations, the conversion rate determination module 515 can execute on the data processing system 110 and can be configured to determine, for the information resource, a conversion rate based on a first number of client identifiers of client devices 125 that visited the information resource and also visited the conversion information resource relative to a second number of client identifiers of client devices 125 that visited the information resource. The data processing system 110 can maintain the visit-related information in a table of entries, as described above. The conversion rate determination module 515 can determine the conversion rate by accessing the table of entries and determining the first number of client identifiers and the second number of client identifiers, and calculating the ration between the first number and the second number.

The visitor management module 205 can identify whether a client device 125 accessed the conversion page based on the table of entries. The conversion page can be identified as described above in connection with FIGS. 2 and 3. Accordingly, the conversion rate determination module 515 can determine a ratio of visitors that visited both a particular information resource and the conversion information resource of the website to all the visitors that visited the particular information resource. As such, the conversion rate determination module 515 can determine a conversion rate for each of the information resources of a website, each conversion rate indicating the percentage of visitors that visited a particular information resource that also eventually converted. In some implementations, the conversion rate determination module 515 can normalize conversion rates across websites. For instance, conversion rates for a website selling vehicles may be much lower than those of a website selling flowers, and so the conversion rate determination module 515 can normalize conversion rates of a website for consistency across different websites.

In some implementations, the conversion rate determination module 515 can determine the conversion rate based on a time limit for conversion between when the client devices 125 visited the information resource and when the client devices 125 visited the conversion information resource. For instance, the conversion rate determination module 515 can set a time limit from when a client device 125 visits an initial information resource to when the client device 125 visits the conversion information resource in determining conversion rates. If the client device 125 visits the conversion information resource outside of the time limit (e.g., two days), then the conversion rate determination module 515 may not consider the visitor as a conversion for purposes of calculating the conversion rate for the initial information resource.

In some implementations, the remarketing list generation module 220 can execute on the data processing system 110 and can be configured to assign a first information resource of the at least one information resource of the website including the online activity reporting script to a first remarketing list based on the determined conversion rate of the first information resource. The first remarketing list can include client identifiers of client devices that visited the first information resource. The remarketing list generation module 220 can organize or rank the information resources of the website according to their respective conversion rates. Based on this ordering, the remarketing list generation module 220 can assign subsets of the information resources to different remarketing lists based on the conversion rates.

For instance, the remarketing list generation module 220 can assign information resources having conversion rates greater than a threshold value to one remarketing list and information resources having conversion rates below the threshold value to a different remarketing list. In some implementations, the remarketing list generation module 220 can determine one or more conversion rate thresholds for use in assigning information resources to remarketing lists. In some implementations, the conversion rate determination module 515 can calculate a median conversion rate based on the conversion rate of each of the at least one information resource of the website including the online activity reporting script, and can assign the at least one conversion rate threshold to be a multiple of the median conversion rate. For instance, the conversion rate determination module 515 can assign a threshold to be the median conversion rate of all conversion rates of the information resources of a website.

In some implementations, the conversion rate determination module 515 can assign a plurality of conversion rate thresholds that are various multiples of the median conversion rate. For instance, the conversion rate determination module 515 can assign separate thresholds corresponding to 0, 0.5, 1, 1.5, and 2 times the median conversion rate, for a total of five different thresholds. Accordingly, the remarketing list generation module 220 can assign information thresholds to the different remarketing lists that are bounded by the thresholds (e.g., information resources that have conversion rates between 1 times and 1.5 times the median conversion rate can be assigned to one remarketing list).

In some implementations, the conversion rate determination module 515 can calculate a mean conversion rate based on the conversion rate of each of the at least one information resource of the website including the online activity reporting script, and the conversion rate determination module 515 can assign the at least one conversion rate threshold based on a multiple of a standard deviation of the mean conversion rate. In some implementations, the conversion rates of the information resources may follow a Poisson distribution, in which case conversion rate thresholds can be derived based on locations of information resources (e.g., a threshold can be determined based on conversion rates of information resources that are proximate the conversion page).

FIG. 6 is a table depicting pages of a website for automatically generating remarketing lists, according to an illustrative implementation. The table 600 depicts a plurality of information resources (webpages) with corresponding conversion rates. The table also illustrates different shaded rows corresponding to different remarketing lists 602, 604, 606, 608, and 608. The depicted information resources (corresponding to some of those depicted in the graph 300) are ranked by their corresponding conversion rates in descending order. In some implementations, the conversion rate determination module 515 can calculate a median conversion rate based on the conversion rates of the information resources of the table 600. The conversion rate determination module 515 can set a plurality of conversion rate thresholds based on the determined median conversion rate. For instance, the conversion rate determination module 515 can assign separate thresholds corresponding to 0, 0.5, 1, 1.5, and 2 times the median conversion rate, for a total of five different thresholds.

For example, the conversion rate determination module 515 can determine that the information resources depicted in table 600 have a median conversion rate of 0.26. The conversion rate determination module 515 can use the determined median conversion rate to determine a plurality of conversion rate thresholds of 0.00 (0 times the median conversion rate), 0.13 (0.5 times the median conversion rate), 0.26 (1.0 times the median conversion rate), 0.39 (1.5 times the median conversion rate), and 0.52 (2.0 times the median conversion rate). With the plurality of thresholds determined, the remarketing list generation module 220 can assign each of the depicted information resources to remarketing lists based on the ranges of conversion rates bounded by the plurality of thresholds and the actual conversion rates of the information resources. For instance, because the information resource "Cart" is the only information resource having a conversion rate above the 0.52 conversion rate threshold (2 times the median conversion rate), the remarketing list generation module 220 can assign only the "Cart" information resource to the remarketing list 602. Similarly, because the information resources "Dress1," "Shoe 1," "Item1," and "Dress2" are the only information resources having conversion rates between the 0.26 conversion rate threshold (1 times the median conversion rate) and the 0.39 conversion rate threshold (1.5 times the median conversion rate), the remarketing list generation module 220 can assign only the information resources "Dress1," "Shoe 1," "Item1," and "Dress2" to the remarketing list 606. Accordingly, the information resources of the table 600 can be segmented and organized into the different remarketing lists 602, 604, 606, 608, and 610.

Figure 7:
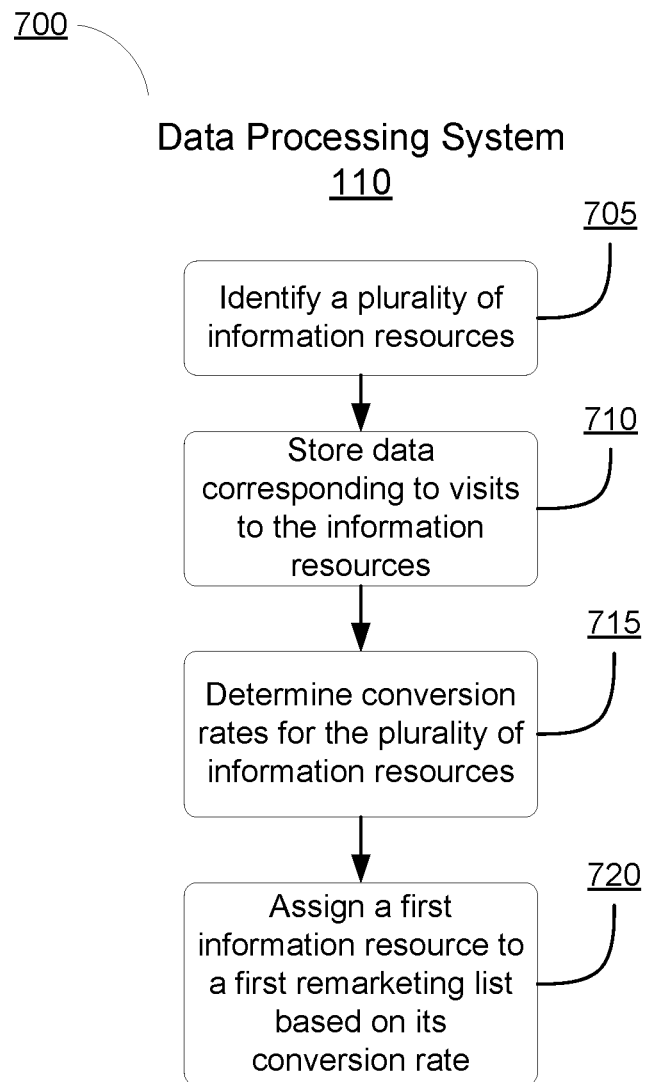
FIG. 7 is a flow diagram depicting a method of automatically generating remarketing lists, according to an illustrative implementation.

FIG. 7 is a flow diagram depicting a method of automatically generating remarketing lists, according to an illustrative implementation. In brief overview, the method 700 can include a data processing system identifying a plurality of information resources (BLOCK 705). The method 700 can include the data processing system storing data corresponding to visits to the information resources (BLOCK 710). The method 700 can include the data processing system determining conversion rates for the plurality of information resources (BLOCK 715). The method 700 can include the data processing system assigning a first information resource to a first remarketing list based on its conversion rate (BLOCK 720).

In further detail, the method 700 can include a data processing system identifying a plurality of information resources (BLOCK 705). The information resource management module 505 can execute on the data processing system 110 and can be configured to identify, for a website corresponding to a content provider 115, the plurality of information resources included in the website. The information resource management module 505 may provide the same functions and operations as the visitor management module 205, and thus can identify client devices that visit the website, the pages of the website, and so on. At least one of the plurality of information resources can be identified as a conversion information resource that is presented responsive to a conversion event.

The method 700 can include the data processing system storing data corresponding to visits to the information resources (BLOCK 710). In some implementations, the visitor management module 205 can execute on the data processing system and can store in a data structure, via the online activity reporting script, for each of the at least one information resource of the website including the online activity reporting script, a plurality of entries corresponding to visits to the information resource by client devices. Each entry of the plurality of entries can identify a resource identifier identifying the information resource, and a client identifier identifying the client device visiting the information resource.

In some implementations, the information resource management module 505 can receive for the at least one information resource of the website including the online activity reporting script, data corresponding to identification of the at least one information resource of the website, identification of a client device that visited the at least one information resource of the website, or a time when the client device visited the at least one information resource of the website. In some implementations, the information resource management module 505 can receive for the conversion information resource of the website, data corresponding to identification of the conversion information resource of the website, identification of a client device that visited the conversion information resource of the website, or a time when the client device visited the conversion information resource of the website.

The method 700 can include the data processing system determining conversion rates for the plurality of information resources (BLOCK 715). The visitor management module 205 can further identify whether a client device 125 accessed the conversion page. Accordingly, the conversion rate determination module 515 can determine a ratio of visitors that visited both a particular information resource and the conversion information resource of the website to all the visitors that visited the particular information resource. In some implementations, the conversion rate determination module 515 can normalize conversion rates across websites. The conversion rate determination module 515 can determine the conversion rate based on a time limit for conversion between when the client identifiers visited the information resource and when the client identifiers visited the conversion information resource.

The method 700 can include the data processing system assigning a first information resource to a first remarketing list based on its conversion rate (BLOCK 720). The remarketing list generation module 220 can execute on the data processing system 110 and can be configured to assign a first information resource of the at least one information resource of the website including the online activity reporting script to a first remarketing list based on the determined conversion rate of the first information resource. The remarketing list generation module 220 can assign information resources having relatively high conversion rates to one remarketing list and information resources having relatively low conversion rates to a different remarketing list. In some implementations, the remarketing list generation module 220 can determine one or more conversion rate thresholds for use in assigning information resources to remarketing lists. In some implementations, the conversion rate determination module 515 can calculate a median conversion rate based on the conversion rate of each of the at least one information resource of the website including the online activity reporting script, and can assign the at least one conversion rate threshold to be a multiple of the median conversion rate.

Figure 8:
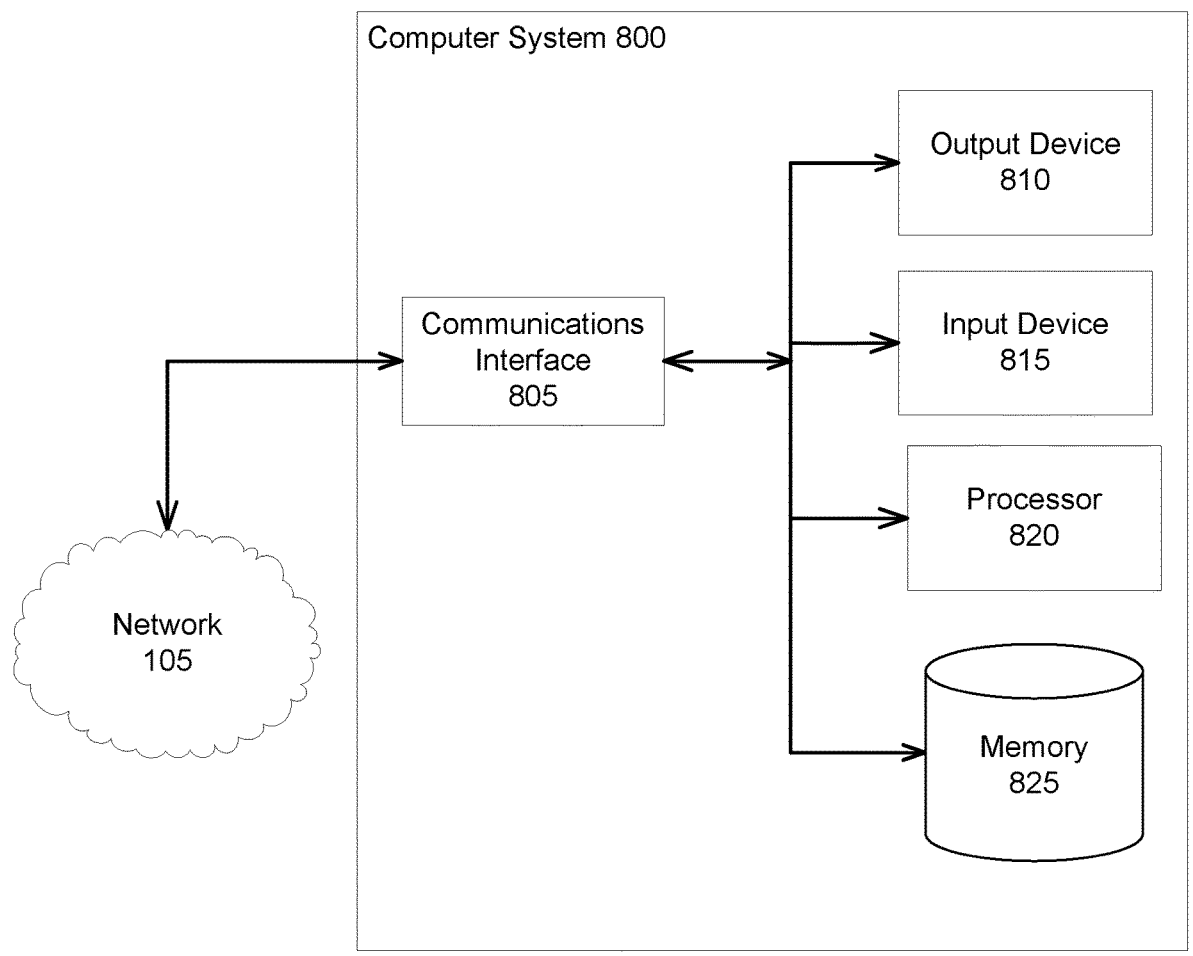
FIG. 8 is a block diagram depicting an illustrative implementation of a general architecture for a computer system that may be employed to implement elements of the systems and methods described and illustrated herein.

FIG. 8 shows the general architecture of an illustrative computer system 800 that may be employed to implement any of the computer systems discussed herein (including the system 110 and its components such as the script provider module 130 and the campaign management module 140) in accordance with some implementations. The computer system 800 can be used to provide information via the network 105 for display. The computer system 800 of FIG. 8 comprises one or more processors 820 communicatively coupled to memory 825, one or more communications interfaces 805, and one or more output devices 810 (e.g., one or more display units) and one or more input devices 815. The processors 820 can be included in the data processing system 110 or the other components of the system 110 such as the script provider module 130 and the campaign management module 140.

In the computer system 800 of FIG. 8, the memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 825 to store information related to the availability of inventory of one or more content units, reservations of one or more content units, among others. The memory 825 can include the database 145. The processor(s) 820 shown in FIG. 8 may be used to execute instructions stored in the memory 825 and, in so doing, also may read from or write to the memory various information processed and or generated pursuant to execution of the instructions.

The processor 820 of the computer system 800 shown in FIG. 8 also may be communicatively coupled to or control the communications interface(s) 805 to transmit or receive various information pursuant to execution of instructions.

For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIG. 1, one or more communications interfaces facilitate information flow between the components of the system 800. In some implementations, the communications interface(s) may be configured (e.g., via various hardware components or software components) to provide a website as an access portal to at least some aspects of the computer system 800. Examples of communications interfaces 805 include user interfaces (e.g., web pages), through which the client device 125 can communicate with the data processing system 110.

The output devices 810 of the computer system 800 shown in FIG. 8 may be provided, for example, to allow various information to be viewed or otherwise perceived in connection with execution of the instructions. The input device(s) 815 may be provided, for example, to allow a client device 125 to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The script provider module 130 and the campaign management module 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the script provider module 130 and the campaign management module 140 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system for automatically generating remarketing lists based on sessions, comprising: one or more processors and a memory, the one or more processors configured to: receive reporting data associated with client device visits to information resources, the reporting data being generated via execution of online reporting scripts embedded in the information resources;
   identify, based on the received reporting data, one or more client sessions, each client session of the one or more client sessions corresponding to a client device visiting one or more information resources;
   determine, from each client session of the one or more client sessions and based on the received reporting data, a plurality of information resource pairs, each information resource pair of the plurality of information resource pairs including a destination information resource and a referrer information resource from which the client device visited the destination information resource;
   construct, using the one or more client sessions, a graph including the plurality of information resource pairs and a respective plurality of edges between the destination information resources and corresponding referrer information resources of the plurality of information resource pairs, wherein each edge of the plurality of edges represents an interaction metric based on a number of client devices that visited the destination information resource of the respective information resource pair from the corresponding referrer information resource of the respective information resource pair, and wherein at least one pair of the plurality of information resource pairs includes a conversion information resource;
   implement a graph clustering module to select, from the plurality of information resource pairs and based on (i) the interaction metrics represented by the corresponding edges and (ii) a number of edges between at least some information resources in the plurality of information resource pairs and the conversion information resource, a subset of information resource pairs, wherein the interaction metrics include weights of click-through rates between the referrer information resource and the destination information resource of the plurality of information resource pairs; and
   generate a client identifier list including one or more client device identifiers each associated with a respective client session of the one or more client sessions that visited a corresponding referrer information resource of at least one information resource pair of the subset of information resource pairs.

2. The system of claim 1, wherein the one or more processors are further configured to maintain, in one or more data structures, an association between a content item and the client identifier list in response to a request from a content provider of the content item.

3. The system of claim 1, wherein the one or more processors are further configured to receive one or more of an identity of a destination information resource, an identity of a referrer information resource, or times at which the destination information resource and the referrer information resource were visited by a client device.

4. The system of claim 1, wherein the one or more processors are further configured to restrict, from selection in the subset of information resource pairs, at least one information resource pair that is associated with a corresponding interaction metric that is less than a threshold.

5. The system of claim 1, wherein the one or more processors are further configured to identify a number of information resource pairs that include the same destination information resource and different referrer information resources.

6. The system of claim 5, wherein the one or more processors are further configured to identify the subset of information resource pairs based on a number of the plurality of information resource pairs including the same destination information resource and different referrer information resource pairs exceeding a threshold.

7. The system of claim 6, wherein the one or more processors, in identifying the subset of information resource pairs, are further configured to:
   determine a click-through rate threshold; and
   identify one or more information resource pairs including the same referrer node and a click-through rate greater than the click-through rate threshold as a part of the subset of information resource pairs.

8. A method for automatically generating remarketing lists based on sessions, comprising:
   receiving, by a data processing system comprising one or more processors and a memory, reporting data associated with client device visits to information resources, the reporting data being generated via execution of online reporting scripts embedded in the information resources;
   identifying, by the data processing system and based on the received reporting data, each client session of the one or more client sessions corresponding to a client device visiting one or more information resources;
   determining, by the data processing system, from each client session of the one or more client sessions and based on the received reporting data, a plurality of information resource pairs, each information resource pair of the plurality of information resource pairs including a destination information resource and a referrer information resource from which the client device visited the destination information resource;
   constructing, by the data processing system and using the one or more client sessions, a graph including the plurality of information resource pairs and a respective plurality of edges between the destination information resources and corresponding referrer information resources of the plurality of information resource pairs, wherein each edge of the plurality of edges represents an interaction metric based on a number of client devices that visited the destination respective information resource of the information resource pair from the corresponding referrer information resource of the respective information resource pair, and wherein at least one pair of the plurality of information resource pairs includes a conversion information resource;
   implementing, by the data processing system, a graph clustering module to select, from the plurality of information resource pairs and based on (i) the interaction metrics represented by the corresponding edges and (ii) a number of edges between at least some information resources in the plurality of information resource pairs and the conversion information resource, a subset of information resource pairs, wherein the interaction metrics include weights of click-through rates between the referrer information resource and the destination information resource of the plurality of information resource pairs; and
   generating, by the data processing system, a client identifier list including client device identifiers each associated with a respective client session of the one or more client sessions that visited a corresponding referrer information resource of at least one information resource pair of the subset of information resource pairs.

9. The method of claim 8, further comprising maintaining, by the data processing system, in one or more data structures, an association between a content item and the client identifier list in response to a request from a content provider of the content item.

10. The method of claim 8, further comprising receiving, by the data processing system, one or more of an identity of a destination information resource, an identity of a referrer information resource, or times at which the destination information resource and the referrer information resource were visited by a client device.

11. The method of claim 8, further comprising restricting, by the data processing system, from selection in the subset of information resource pairs, at least one information resource pair that is associated with a corresponding interaction metric that is less than a threshold.

12. The method of claim 8, further comprising identifying, by the data processing system, a number of information resource pairs that include the same destination information resource and different referrer information resources.

13. The method of claim 12, wherein identifying the subset of information resource pairs is based on a number of the plurality of information resource pairs including the same destination information resource and different referrer information resource pairs exceeding a threshold.

14. The method of claim 13, wherein identifying the subset of information resource pairs further comprises:
   determining, by the data processing system, a click-through rate threshold; and
   identifying, by the data processing system, one or more information resource pairs including the same referrer node and a click-through rate greater than the click-through rate threshold as a part of the subset of information resource pairs.

* * * * *

UNITED STATES PATENT AND TRADEMARK OFFICE
CERTIFICATE OF CORRECTION

PATENT NO. : 12,260,433 B2  
APPLICATION NO. : 17/568713  
DATED : March 25, 2025  
INVENTOR(S) : Bharath Pattabiraman et al.

Page 1 of 1

It is certified that error appears in the above-identified patent and that said Letters Patent is hereby corrected as shown below:

On the Title Page

Item (57), Lines 12-13, "pairs including." should be -- pairs. --.

In the Claims

At Column 35, Lines 60-61, "one or more processors......configured to:" should be at Line 61, as a new sub-point.

At Column 35, Lines 61-65, "receive reporting data........information resources;" should be at Line 62, as a new sub-point.

Signed and Sealed this  
Twenty-ninth Day of July, 2025

Coke Morgan Stewart  
*Acting Director of the United States Patent and Trademark Office*